(12) United States Patent
Murphy et al.

(10) Patent No.: US 11,164,474 B2
(45) Date of Patent: Nov. 2, 2021

(54) METHODS AND SYSTEMS FOR USER-INTERFACE-ASSISTED COMPOSITION CONSTRUCTION

(71) Applicant: ThinkCERCA.com, Inc., Chicago, IL (US)

(72) Inventors: Eileen Murphy, Chicago, IL (US); Joshua Tolman, Elmhurst, IL (US)

(73) Assignee: ThinkCERCA.com, Inc., Chicago, IL (US)

( * ) Notice: Subject to any disclaimer, the term of this patent is extended or adjusted under 35 U.S.C. 154(b) by 303 days.

(21) Appl. No.: 15/424,534

(22) Filed: Feb. 3, 2017

(65) Prior Publication Data

US 2017/0229032 A1  Aug. 10, 2017

Related U.S. Application Data

(60) Provisional application No. 62/292,005, filed on Feb. 5, 2016, provisional application No. 62/292,012, filed on Feb. 5, 2016.

(51) Int. Cl.
| | |
|---|---|
| *G09B 7/02* | (2006.01) |
| *G06F 3/0484* | (2013.01) |
| *G09B 7/08* | (2006.01) |
| *G09B 5/08* | (2006.01) |
| *G09B 5/06* | (2006.01) |

(Continued)

(52) U.S. Cl.
CPC ........... *G09B 7/02* (2013.01); *G06F 3/04847* (2013.01); *G06F 40/169* (2020.01); *G09B 5/02* (2013.01); *G09B 5/06* (2013.01); *G09B 5/08* (2013.01); *G09B 7/06* (2013.01); *G09B 7/08* (2013.01);

(Continued)

(58) Field of Classification Search
CPC ...... G06F 3/04847; G06F 17/241; G09B 5/02
See application file for complete search history.

(56) References Cited

U.S. PATENT DOCUMENTS

| | | | | |
|---|---|---|---|---|
| 5,886,697 | A * | 3/1999 | Naughton | H04L 12/2803 345/473 |
| 7,717,712 | B2 * | 5/2010 | Brun | G06F 17/274 434/156 |

(Continued)

*Primary Examiner* — Jerry-Daryl Fletcher
*Assistant Examiner* — Sadaruz Zaman
(74) *Attorney, Agent, or Firm* — Invention Mine LLC

(57) ABSTRACT

Disclosed herein are methods and systems for user-interface-assisted composition construction. In an embodiment, a plurality of input fields, each having an argument-element type, is presented via a client-side user interface, initially arranged according to a predefined sequence. Textual inputs are received via the input fields, and corresponding argument-building-block elements are responsively presented via the client-side user interface according to a current arrangement on the client-side user interface of the input fields. Each presented argument-building-block element has the same argument-element type and the received textual input of the corresponding user-interface input field. Argument-building selections of one or more of the presented argument-building-block elements are received via the client-side user interface, and a composition is responsively generated in a displayed text editor at least in part by populating the textual inputs into the displayed text editor according to the received argument-building selections. The generated composition is submitted for evaluation.

20 Claims, 25 Drawing Sheets

(51) Int. Cl.
  *H04L 29/06* (2006.01)
  *G06F 40/169* (2020.01)
  *G09B 5/02* (2006.01)
  *G09B 7/06* (2006.01)
  *H04L 29/08* (2006.01)

(52) U.S. Cl.
  CPC .............. *H04L 67/02* (2013.01); *H04L 67/06* (2013.01); *H04L 67/327* (2013.01); *H04L 67/42* (2013.01)

(56) References Cited

U.S. PATENT DOCUMENTS

| | | | |
|---|---|---|---|
| 8,714,986 B2 | 5/2014 | Dodelson | |
| 9,966,065 B2* | 5/2018 | Gruber | G06F 17/2705 |
| 10,353,720 B1* | 7/2019 | Wich-Vila | G06Q 10/06395 |
| 2002/0192631 A1* | 12/2002 | Weir | G09B 5/02 434/350 |
| 2003/0036040 A1* | 2/2003 | Kurzweil | G06F 17/27 434/169 |
| 2006/0204949 A1* | 9/2006 | Fok | G06F 9/453 434/362 |
| 2008/0229185 A1* | 9/2008 | Lynch | G06F 17/241 715/230 |
| 2011/0098110 A1* | 4/2011 | Howell | G09B 5/02 463/31 |
| 2011/0258542 A1* | 10/2011 | Kenney | G06F 3/04847 715/702 |
| 2013/0275164 A1* | 10/2013 | Gruber | G10L 17/22 705/5 |
| 2014/0089315 A1* | 3/2014 | Krause | G06F 17/2235 707/741 |
| 2014/0089316 A1* | 3/2014 | Krause | G06F 16/9558 707/741 |
| 2014/0122991 A1* | 5/2014 | Achillopoulos | G06F 40/169 715/230 |
| 2014/0255889 A1* | 9/2014 | Grimes | G09B 19/00 434/236 |
| 2014/0272847 A1 | 9/2014 | Grimes | |
| 2014/0272894 A1 | 9/2014 | Grimes | |
| 2014/0278895 A1 | 9/2014 | Grimes | |
| 2015/0206446 A1 | 7/2015 | Gupta | |
| 2015/0261859 A1* | 9/2015 | Isensee | G06F 17/30864 707/723 |
| 2015/0348551 A1* | 12/2015 | Gruber | G06F 17/2705 704/235 |
| 2016/0092095 A1* | 3/2016 | Fibaek | G06F 3/0488 715/762 |
| 2016/0148330 A1* | 5/2016 | Roman | G06Q 50/205 705/326 |
| 2017/0229032 A1* | 8/2017 | Tolman | H04L 67/02 |
| 2017/0230479 A1* | 8/2017 | Tolman | G09B 7/02 |

* cited by examiner

FIG. 5

[Unit:Poetry] {Assignment:"The Roller Coaster" (Course:English 101)}

502

506 — NEXT>

504 — 6 Compose

Build an Argument — 5

Summarize — 4

Engage with the Text — 3

Read — 2

Connect — 1

520 Step 1: Connect

Task: Describe a time that you used positive thinking or looking forward to something to help you get through a difficult situation.

524

[Enter text.]

522

526

514

602 Topic Vocabulary word1: (part of speech 1) definition1
word2: (part of speech 2) definition2
word3: (part of speech 3) definition3
word4: (part of speech 4) definition4
word5: (part of speech 5) definition5

604

512

A Overview
B Vocabulary
C Text
D Rubric
E Highlights
F Your Work 508 510

Central Question: How does the author of the source-material selection communicate emotions using elements of repetition and sound?

[Unit:Poetry] {Assignment:"The Roller Coaster" (Course:English 101)} ← 502

← 504  506

① Connect — ② Read — ③ Engage with the Text — ④ Summarize — ⑤ Build an Argument — ⑥ Compose — NEXT>

Source-Material Text 702

The Roller Coaster
By Example Author     708

[Line 1 of Source-Material Selection]
[Line 2 of Source-Material Selection]
[Line 3 of Source-Material Selection]
[Line 4 of Source-Material Selection]
[Line 5 of Source-Material Selection]

704

512   706

Step 1: Connect 520

Task: Describe a time that you used positive thinking or looking forward to something to help you get through a difficult situation.

524

[Enter text.]  522

526   514

Ⓐ Overview  Ⓑ Vocabulary  Ⓓ Text  Ⓔ Rubric  Ⓔ Highlights  Ⓕ Your Work 508  510

Central Question: How does the author of the source-material selection communicate emotions using elements of repetition and sound?

[Unit:Poetry] {Assignment:"The Roller Coaster" (Course:English 101)} 502

504 ← 506

☆ Connect | ② Read | ③ Engage with the Text | ④ Summarize | ⑤ Build an Argument | ⑥ Compose | NEXT>

☆ Step 1: Connect 520

Task: Describe a time that you used positive thinking or looking forward to something to help you get through a difficult situation.

524

[icons]

[Enter text.]

522

526
514

Ⓐ Overview
Ⓑ Vocabulary
Ⓒ Text
☆ Rubric
Ⓔ Highlights
Ⓕ Your Work 508
510

☆ Rubric 802

[Evaluation Criteria] 804

VIEW FULL RUBRIC 808

512

Central Question: How does the author of the source-material selection communicate emotions using elements of repetition and sound?

[Unit:Poetry] {Assignment:"The Roller Coaster" (Course:English 101)} ← 504 506 → 502 →

① Connect  ② Read  ③ Engage with the Text  ④ Summarize  ⑤ Build an Argument  ⑥ Compose  NEXT>

Ⓐ Overview
Ⓑ Vocabulary
Ⓒ Text
Ⓓ Rubric
Ⓔ Highlights
Ⓕ Your Work 508 510

Highlights — 902

Highlight1 Color/Category
*Highlight1 word1*
[Highlight1-specific notes]

Highlight2 Color/Category
*Highlight2 word2*
[Highlight2-specific notes]

Highlight3 Color/Category
*Highlight3 word3*
[Highlight3-specific notes]

904
512

Central Question: How does the author of the source-material selection communicate emotions using elements of repetition and sound?

Step 1: Connect — 520

Task: Describe a time that you used positive thinking or looking forward to something to help you get through a difficult situation.

524

*[Enter text.]*

[Unit:Poetry] {Assignment:"The Roller Coaster" (Course:English 101)} ← 502

① Connect  ② Read  ③ Engage with the Text ④ Summarize ⑤ Build an Argument ⑥ Compose  <PREV  NEXT>

504 ← 506

Step 3: Engage with the Text 1202

Task:
As you analyze the text of the source-material selection, use the following different-color highlighting to identify the corresponding different parts of the text:

| Yellow | for | Rhyming Words/Phrases |
| Blue | for | Emotional Words/Phrases |
| Green | for | Repeating Words/Phrases |

1204

514

Source-Material Text 702

TITLE   710
By Author
[Line 1 of Source-Material Selection]
[Line 2 of Source-Material Selection]
[Line 3 of Source-Material Selection]
[Line 4 of Source-Material Selection]
[Line 5 of Source-Material Selection]

706

708

512

A Overview
B Vocabulary
☆ Text
D Rubric
E Highlights
F Your Work 508 510

Central Question: How does the author of the source-material selection communicate emotions using elements of repetition and sound?

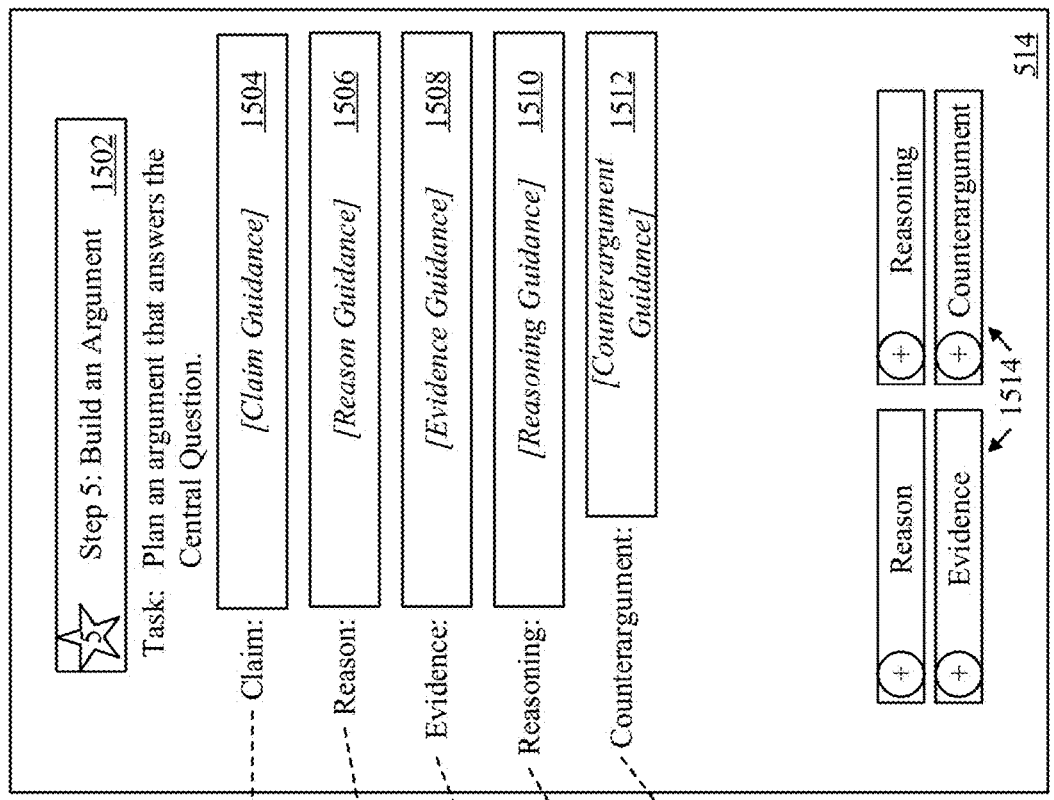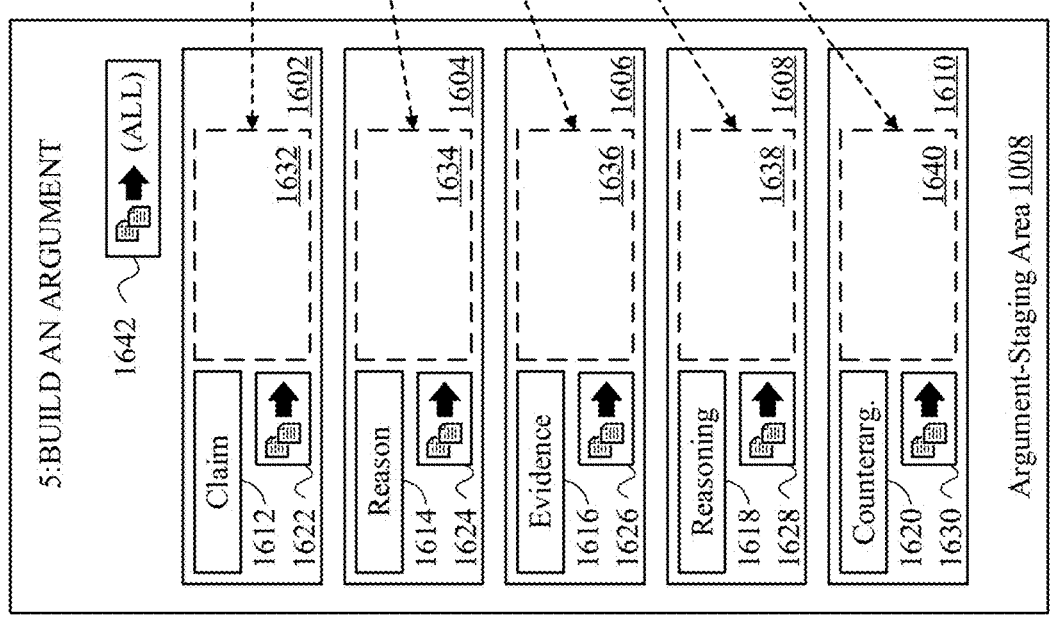
FIG. 16

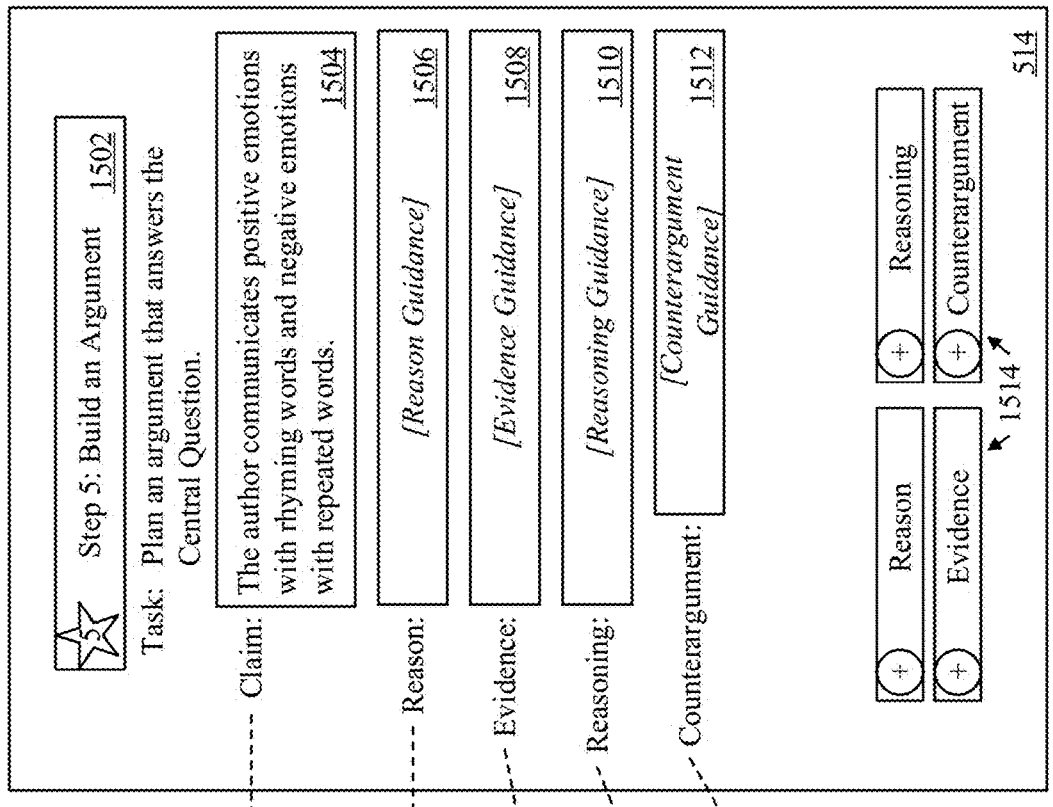
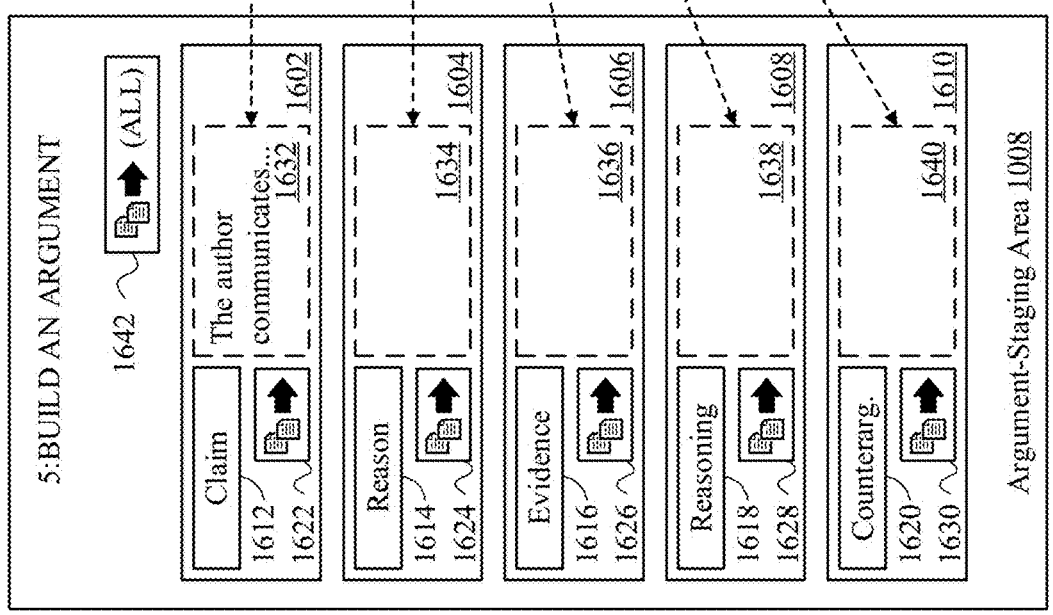
FIG. 17

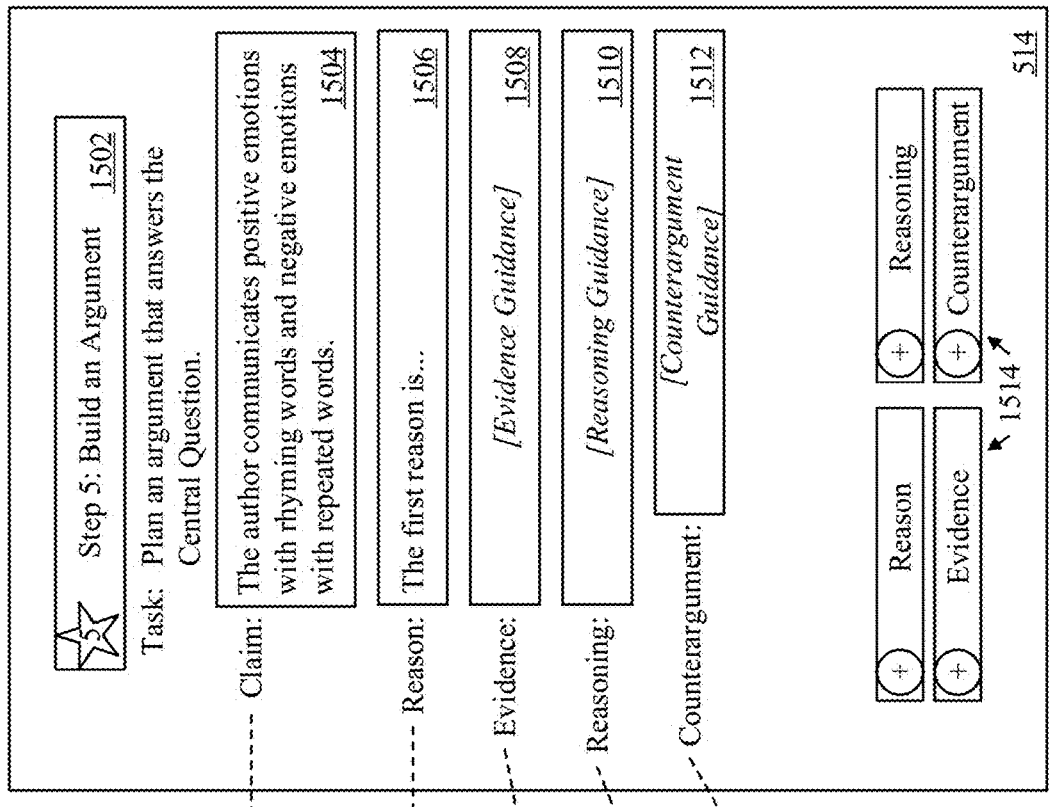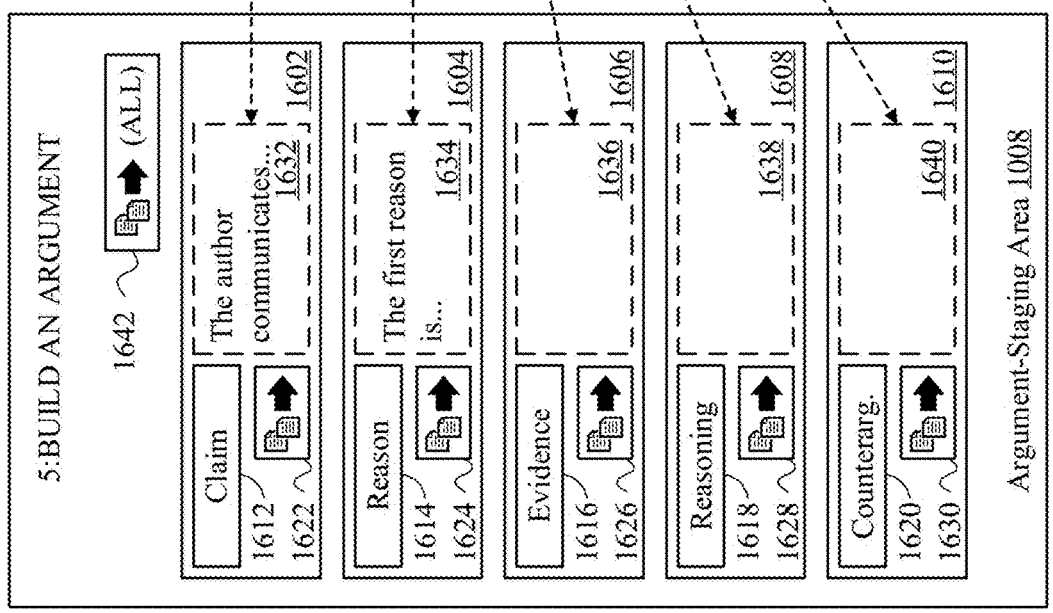
FIG. 18

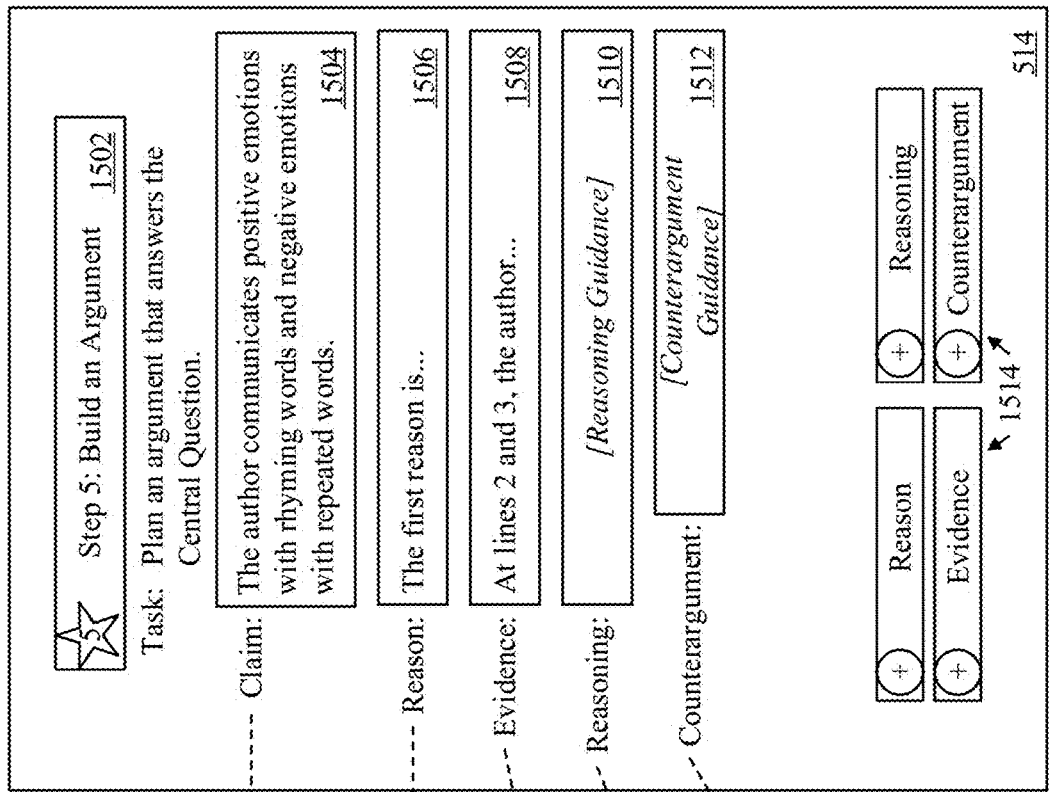
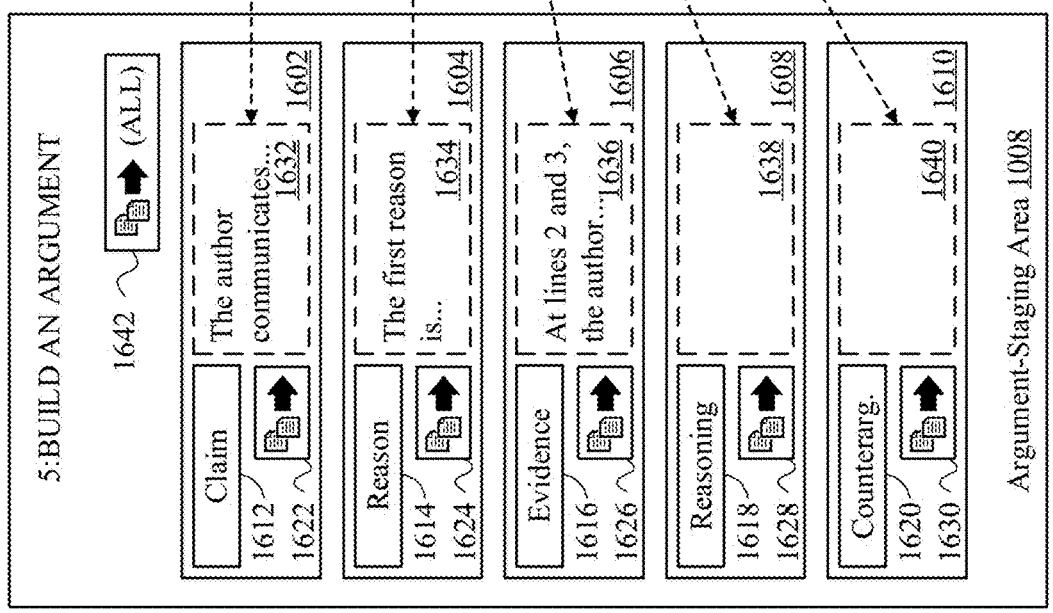
FIG. 19

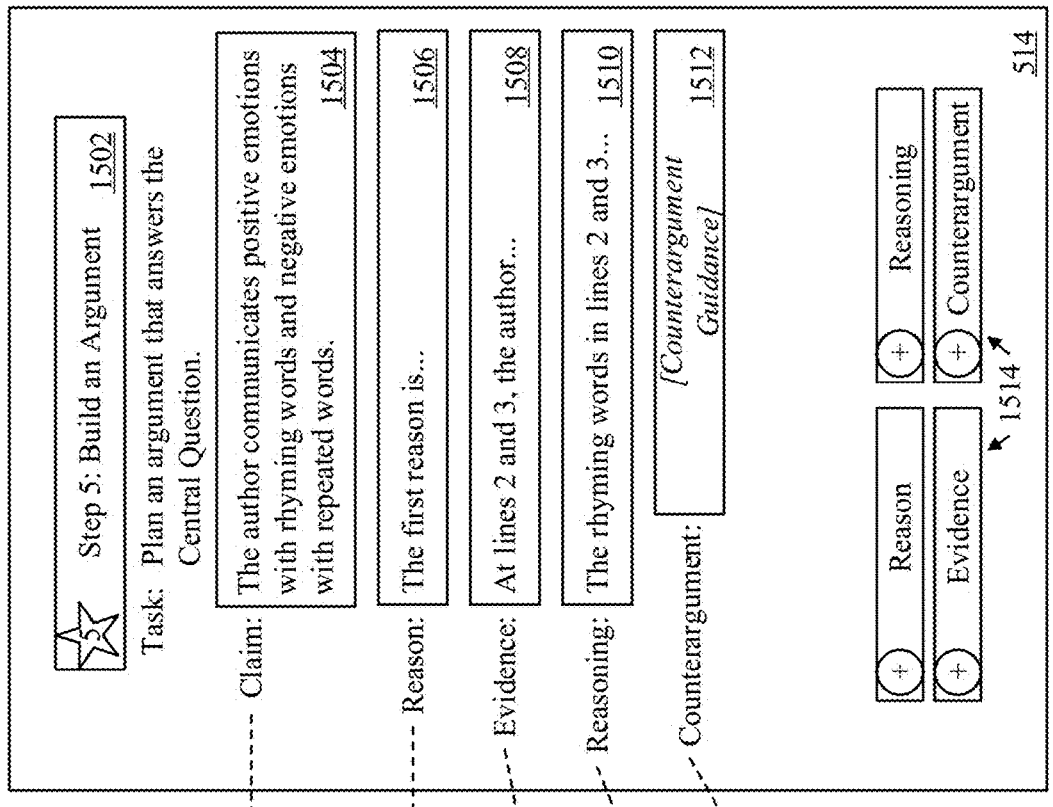
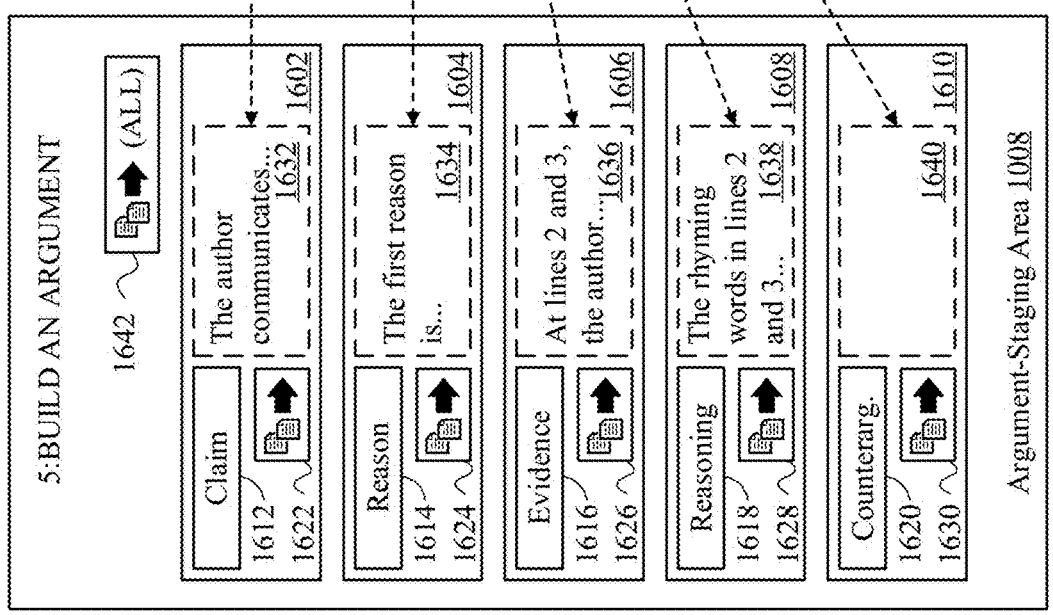
FIG. 20

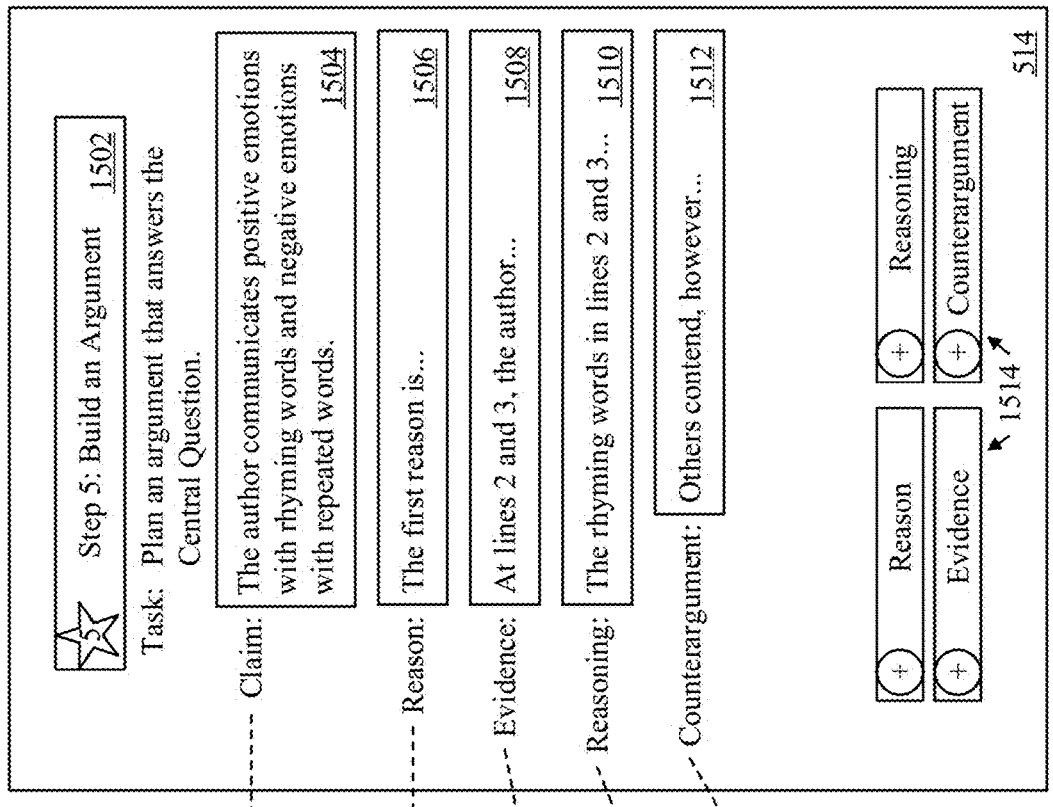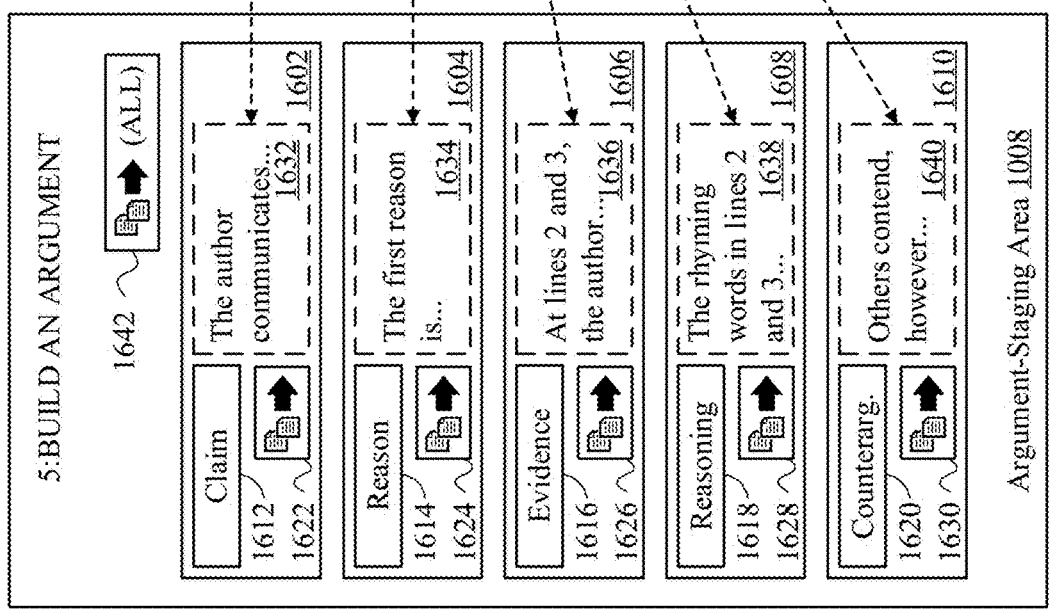
FIG. 21

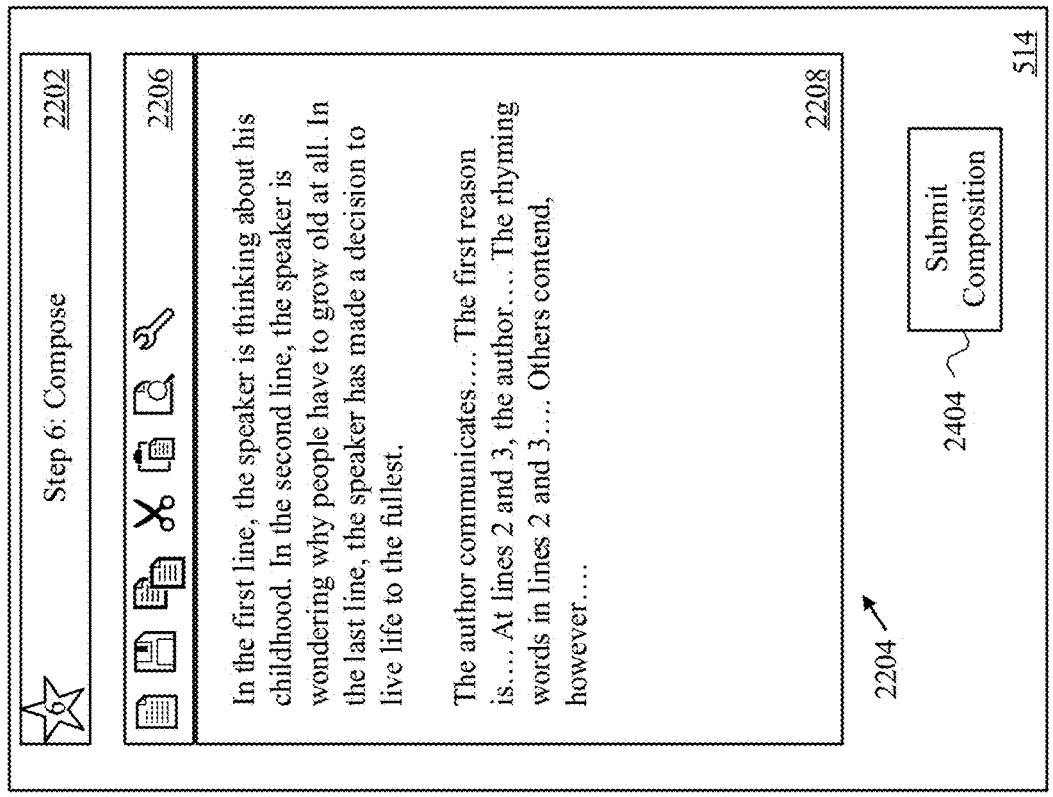
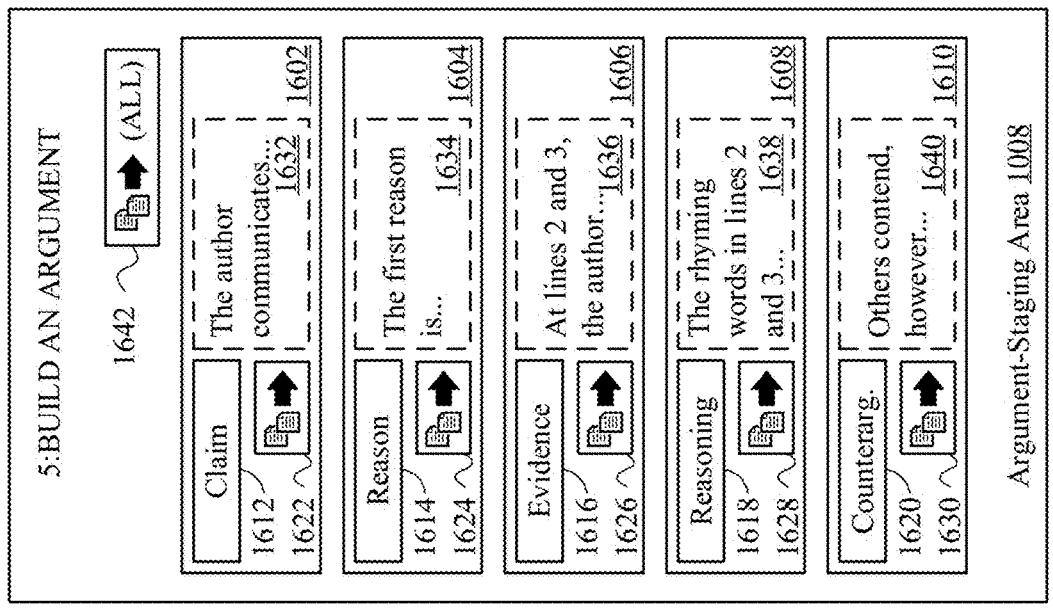
FIG. 25

METHODS AND SYSTEMS FOR USER-INTERFACE-ASSISTED COMPOSITION CONSTRUCTION

CROSS-REFERENCE TO RELATED APPLICATIONS

This application claims the benefit of U.S. Provisional Patent Application No. 62/292,005, filed Feb. 5, 2016 and entitled "Methods and Systems for User-Interface-Assisted Composition Construction," and U.S. Provisional Patent Application No. 62/292,012, filed Feb. 5, 2016 and entitled "Methods and Systems for Mitigating the Effects of Intermittent Network Connectivity in Educational Settings," the entire contents of both of which are hereby incorporated herein by reference.

BACKGROUND

Today's students are living and studying in an increasingly technological age. Computers, mobile devices, and Internet communication are virtually ubiquitous in modern society. Today's classrooms are no exception. More and more, today's schools are equipped with Internet access in the classroom, be it by way of wired (typically Ethernet) or wireless (typically Wi-Fi) connections. In an example scenario, a given school may connect to the outside world (e.g., to the Internet) by way of a firewalled network access server (NAS), which may in turn provide connectivity to computers on various floors, in various classrooms, in various computer labs, in various offices or other administrative locations, and the like.

Whether in a classroom, in a computer lab, or perhaps at a remote location (e.g., doing homework at home in the evening), a student may access technological educational tools in a number of different ways and via a number of different types of devices. The student may interact with an installed application and/or webpages via a web browser, as examples. The device may be a smartphone, a tablet, a laptop computer, a desktop computer, and/or the like.

Among other purposes, technological educational tools are used in order to effectively teach students and also in order to better prepare those students for the increasingly technological world in which they are growing up and which they are studying in preparation of joining. It is important that technological educational tools are a net positive in the classroom: they should add to the teacher's ability to effectively convey concepts, assign tasks, and assess progress; they should not inefficiently bog down the educational process with cumbersome and inefficient implementations. Technology in the classroom and generally as part of educating students is not necessarily a good in and of itself; it has to be done well.

OVERVIEW OF DISCLOSED EMBODIMENTS

Disclosed herein are methods and systems for user-interface-assisted composition construction.

One embodiment takes the form of a method that includes presenting, via a client-side user interface, a plurality of user-interface input fields that are initially arranged on the client-side user interface according to a predefined sequence. Each of the user-interface input fields has a respective argument-element type from among a plurality of argument-element types. The method also includes receiving textual inputs via the respective user-interface input fields, and responsively presenting corresponding argument-building-block elements via the client-side user interface according to a current arrangement on the client-side user interface of the user-interface input fields. Each presented argument-building-block element has the same argument-element type as, and includes the textual input received via, the corresponding user-interface input field. The method also includes receiving, via the client-side user interface, argument-building selections of one or more of the presented argument-building-block elements, and responsively generating a composition in a displayed text editor at least in part by populating the textual inputs into the displayed text editor according to the received argument-building selections. The method also includes submitting the generated composition for evaluation.

Another embodiment takes the form of a client-side computing device that includes a client-device communication interface, a client-device user interface, a client-device processor, and client-device data storage containing client-device instructions executable by the client-device processor for causing the client-side computing device to carry out at least the functions listed in the preceding paragraph.

In at least one embodiment, the plurality of argument-element types includes claim, reasoning, and evidence. In at least one such embodiment, the plurality of argument-element types also includes reason and counterargument; in at least one such embodiment, the predefined sequence is claim, reason, evidence, reasoning, counterargument.

In at least one embodiment, the generated composition pertains to a source-material selection, and the method also includes presenting, via the client-side user interface, the source-material selection in juxtaposition with the presented plurality of user-interface input fields. Such embodiments are referred to for brevity and clarity in the ensuing paragraphs as source-material-selection embodiments.

In at least one source-material-selection embodiment, the method also includes receiving annotation input with respect to the presented source-material selection, and responsively updating the presented source-material selection to reflect the received annotation input. In at least one such source-material-selection embodiment, the received annotation input includes note input. In at least one such source-material-selection embodiment, the received annotation input includes highlighting input with respect to a portion of the presented source-material selection; such embodiments are referred to for brevity and clarity in the ensuing paragraphs as highlighted-source-material embodiments.

In at least one highlighted-source-material embodiment, the method also includes presenting, via the client-side user interface, an additional argument-building-block element that includes the highlighted portion of the presented source-material selection. In at least one such highlighted-source-material embodiment, an argument-element type of the additional argument-building-block element is evidence. In at least one such highlighted-source-material embodiment, presenting the additional argument-building-block element via the client-side user interface is carried out responsive to receiving the highlighting input. In at least one such highlighted-source-material embodiment, the method also includes receiving, via the client-side user interface, an add-building-block command with respect to the highlighted portion of the presented source-material selection, and presenting the additional argument-building-block element via the client-side user interface is carried out responsive to receiving the add-building-block command.

In at least one embodiment, the presented argument-building-block elements have the appearance of respective index cards.

In at least one embodiment, the corresponding argument-building-block elements are presented in a designated staging area on the client-side user interface.

In at least one embodiment, the method also includes receiving, via the client-side user interface, reordering input with respect to the user-interface input fields, and responsively reordering both the user-interface input fields and the corresponding argument-building-block elements in accordance with the received reordering input. In at least one such embodiment: (i) the method also includes, prior to receiving the reordering input, receiving, via the client-side user interface, linking input with respect to a contiguous sequence of two or more of the user-interface input fields; (ii) the contiguous sequence of the user-interface input fields corresponds to a contiguous sequence of the argument-building-block elements; and (iii) reordering both the user-interface input fields and the corresponding argument-building-block elements in accordance with the received reordering input includes keeping intact both (a) the contiguous sequence of user-interface input fields and (b) the contiguous sequence of the argument-building-block elements. In at least one other such embodiment: (i) the method also includes, prior to receiving the reordering input, receiving, via the client-side user interface, linking input with respect to a contiguous sequence of two or more of the argument-building-block elements; (ii) the contiguous sequence of the argument-building-block elements corresponds to a contiguous sequence of corresponding user-interface input fields; and (iii) reordering both the user-interface input fields and the corresponding argument-building-block elements in accordance with the received reordering input includes keeping intact both (a) the contiguous sequence of user-interface input fields and (b) the contiguous sequence of the argument-building-block elements.

In at least one embodiment, the method also includes receiving, via the client-side user interface, reordering input with respect to the argument-building-block elements, and responsively reordering both the user-interface input fields and the corresponding argument-building-block elements in accordance with the received reordering input. In at least one such embodiment: (i) the method also includes, prior to receiving the reordering input, receiving, via the client-side user interface, linking input with respect to a contiguous sequence of two or more of the user-interface input fields; (ii) the contiguous sequence of the user-interface input fields corresponds to a contiguous sequence of the argument-building-block elements; and (iii) reordering both the user-interface input fields and the corresponding argument-building-block elements in accordance with the received reordering input includes keeping intact both (a) the contiguous sequence of user-interface input fields and (b) the contiguous sequence of the argument-building-block elements. In at least one other such embodiment: (i) the method also includes, prior to receiving the reordering input, receiving, via the client-side user interface, linking input with respect to a contiguous sequence of two or more of the argument-building-block elements; (ii) the contiguous sequence of the argument-building-block elements corresponds to a contiguous sequence of corresponding user-interface input fields; and (iii) reordering both the user-interface input fields and the corresponding argument-building-block elements in accordance with the received reordering input includes keeping intact both (a) the contiguous sequence of user-interface input fields and (b) the contiguous sequence of the argument-building-block elements.

In at least one embodiment: (i) the method also includes, receiving, via the client-side user interface, linking input with respect to a contiguous sequence of two or more of the user-interface input fields; (ii) the contiguous sequence of the user-interface input fields corresponds to a contiguous sequence of the argument-building-block elements; (iii) a particular received argument-building selection is with respect to the contiguous sequence of the argument-building block elements; and (iv) populating the corresponding textual input into the displayed text editor includes populating into the displayed text editor a concatenated sequence of the respective textual inputs of the respective argument-building-block elements of the contiguous sequence of the argument-building-block elements.

In at least one embodiment: (i) the method also includes receiving, via the client-side user interface, linking input with respect to a contiguous sequence of two or more of the argument-building block elements; (ii) a particular received argument-building selection is with respect to the contiguous sequence of the argument-building block elements; and (iii) populating the corresponding textual input into the displayed text editor includes populating into the displayed text editor a concatenated sequence of the respective textual inputs of the respective argument-building-block elements of the contiguous sequence of the argument-building-block elements.

In at least one embodiment, the method also includes presenting, via the client-side user interface, a plurality of additional user-interface elements that are selectable for displaying additional instances of user-interface input fields having respective argument-element types from among the plurality of argument-element types.

In at least one embodiment, the client-side user interface includes a dedicated content-display pane and a dedicated working pane. In at least one such embodiment, the client-side user interface also includes (i) a first control panel for selecting what is displayed in the dedicated content-display pane from among a plurality of content-display options and (ii) a second control panel for selecting what is displayed in the dedicated working pane from among a plurality of working-pane options. In at least one such embodiment, the plurality of content-display options includes two or more of a source-material selection on which the composition is to be based, an overview of the source-material selection, a selection of vocabulary pertaining to the source-material selection, a rubric pertaining to the composition, a set of user annotations of the source-material selection, and a designated staging area for user work product pertaining to the source-material selection. In at least one such embodiment, the plurality of working-pane options includes an ordered series of predefined different types of user-input stages for producing the composition based on the source-material selection.

In at least one embodiment, at least one received argument-building selection is received as a single click.

In at least one embodiment, at least one received argument-building selection is received as a drag-and-drop action.

In at least one embodiment: (i) the method also includes receiving text-modification input via the displayed text editor with respect to the populated textual inputs and (ii) generating the composition further includes modifying the populated textual inputs in the displayed text editor according to the received text-modification input prior to submitting the generated composition for evaluation.

In at least one embodiment: (i) the method also includes iteratively saving the generated composition to a remote server and (ii) submitting the generated composition for evaluation includes transmitting a message to the remote server to indicate that the iteratively saved composition has been deemed submitted for evaluation.

In at least one embodiment, evaluation includes grading in an educational context.

In at least one embodiment, the method also includes (i) monitoring presence and absence of connectivity to a remote server, (ii) operating in a local-saving mode during absence of connectivity, and (iii) operating in a remote-saving mode during presence of connectivity.

In at least one embodiment, the method also includes (i) detecting, via the client-side user interface, a modification to the textual input in a given user-interface field in the plurality of user-interface fields, and responsively updating a status parameter of the given user-interface field from a clean state to a dirty state and (ii) including the given user-interface field in a save operation on the basis of the status parameter of the given user-interface field being in the dirty state. In at least one such embodiment, the method also includes determining that the save operation was successful, and responsively updating the status parameter of the given user-interface field to the clean state.

In at least one embodiment, the method also includes detecting, via the client-side user interface, a save-triggering event, and responsively making at least one save attempt to save a student's current work to a remote server. Such embodiments are referred to for brevity and clarity in the ensuing paragraphs as save-triggering-event embodiments.

In at least one save-triggering-event embodiment, the save-triggering event includes a focus-change event. In at least one such save-triggering-event embodiment, the focus-change event includes a user-interface-element-close event. In at least one such save-triggering-event embodiment, the focus-change event includes a user-interface-element-hide event. In at least one such save-triggering-event embodiment, the focus-change event includes a user-interface-element-switch event; in at least one such save-triggering-event embodiment, the user-interface-element-switch event includes modification of a first user-interface element followed by selection of a second user-interface element; in at least one such save-triggering-event embodiment, the user-interface-element-switch event includes modification of a first user-interface element followed by modification of a second user-interface element.

In at least one save-triggering-event embodiment, the save-triggering event includes a user-interface-element-reorder event.

In at least one save-triggering-event embodiment, the student's current work includes incremental work by the student with respect to a previous save.

In at least one save-triggering-event embodiment, making at least one save attempt includes (i) making a first save attempt and initiating an attempt timer and (ii) detecting an expiration of the attempt timer, and responsively making a second save attempt.

In at least one save-triggering-event embodiment, the method also includes detecting failure to save the student's work to the remote server by each and every save attempt in the at least one save attempt, and responsively transitioning the client-side user interface to a read-only state. In at least one such save-triggering-event embodiment, the client-side user interface is transitioned to the read-only state for a predetermined time period; in at least one such save-triggering-event embodiment, the method also includes, after expiration of the predetermined time period, making at least one additional save attempt to save the student's current work to the remote server.

In at least one save-triggering-event embodiment, the student's current work pertains to multiple different types of assigned tasks.

In at least one embodiment, the method is carried out at least in part by a web browser executing on a processor-based computing-and-communication system.

In at least one embodiment, the method is carried out at least in part by runtime execution of JavaScript code.

In at least one embodiment, the method is carried out at least in part by a JavaScript argument-builder studentResponse model. In at least one such embodiment, the JavaScript argument-builder studentResponse model is a child model of a JavaScript studentAssignment model; in at least one such embodiment, the JavaScript studentAssignment model includes at least one additional child JavaScript studentResponse model other than the JavaScript argument-builder studentResponse model; in at least one such embodiment, the at least one additional child JavaScript studentResponse model includes a different-format JavaScript studentResponse model having a different student-input format than that of the JavaScript argument-builder studentResponse model; in various different such embodiments, the student-input format of a different-format JavaScript studentResponse model may include a free-text format, a multiple-choice format, a sentence-completion format that utilizes prepopulated sentence stubs, and/or a text-highlighting format.

Moreover, any of the variations and permutations described above and/or anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

Furthermore, the above-listed overview of disclosed embodiments is meant to be illustrative and is not meant to be exhaustive, comprehensive, or otherwise limiting. Those of skill in the relevant art will understand this and will further understand that variations and modifications of the above-listed embodiments, and indeed of any of the disclosed embodiments, can be made without departing from the spirit or scope of the present disclosure.

BRIEF DESCRIPTION OF THE DRAWINGS

FIG. 5 is a first example screenshot of a client-side user interface, in accordance with at least one embodiment.

FIG. 6 is a second example screenshot of a client-side user interface, in accordance with at least one embodiment.

FIG. 7 is a third example screenshot of a client-side user interface, in accordance with at least one embodiment.

FIG. 8 is a fourth example screenshot of a client-side user interface, in accordance with at least one embodiment.

FIG. 9 is a fifth example screenshot of a client-side user interface, in accordance with at least one embodiment.

FIG. 12 is an eighth example screenshot of a client-side user interface, in accordance with at least one embodiment.

FIG. 16 is a twelfth example screenshot of a client-side user interface, in accordance with at least one embodiment.

FIG. 17 is a thirteenth example screenshot of a client-side user interface, in accordance with at least one embodiment.

FIG. 18 is a fourteenth example screenshot of a client-side user interface, in accordance with at least one embodiment.

FIG. 19 is a fifteenth example screenshot of a client-side user interface, in accordance with at least one embodiment.

FIG. 20 is a sixteenth example screenshot of a client-side user interface, in accordance with at least one embodiment.

FIG. 21 is a seventeenth example screenshot of a client-side user interface, in accordance with at least one embodiment.

FIG. 25 is a twenty-first example screenshot of a client-side user interface, in accordance with at least one embodiment.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . " And it is for reasons akin to brevity and clarity of presentation that this implied leading clause is not repeated ad nauseum in the below detailed description of the drawings.

DETAILED DESCRIPTION OF THE DRAWINGS

Figure 1:
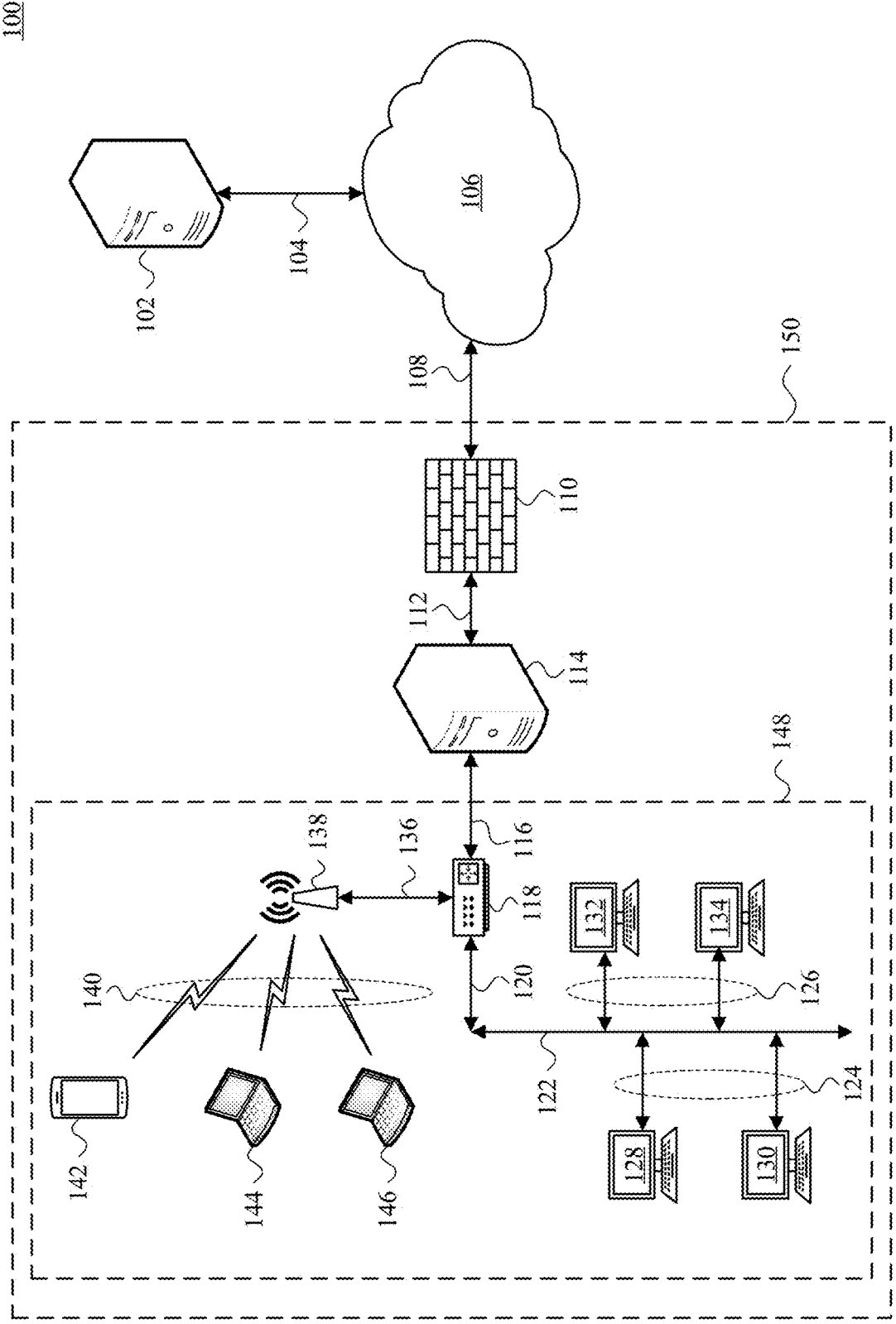
FIG. 1 depicts an example communication system that includes an example server and a number of example client-side computing devices, in accordance with at least one embodiment.

FIG. 1 depicts an example communication system that includes an example server and a number of example client-side computing devices, in accordance with at least one embodiment. In particular, FIG. 1 depicts a communication system 100 that includes a server 102, a data-communication link (i.e., link) 104, a packet-data network 106, a link 108, a firewall 110, a link 112, an NAS 114, a link 116, a router 118, a link 120, a wired local area network (LAN) 122, links 124-126, desktop computers 128-134, a link 136, a wireless access point 138, links 140, a tablet 142, laptop computers 144-146, a classroom-network zone 148, and a school-network zone 150. It should be understood that the communication system 100 is presented by way of example and not limitation, as numerous other example communication systems could be present in various different scenarios.

The server 102 is connected by the link 104 to the packet-data network 106. An example structure of the server 102 is discussed below in connection with FIG. 2. The link 104, like all links discussed in this disclosure, could include one or more wired links, one or more wireless links, one or more networks, one or more access points, one or more routers, switches, bridges, computers, etc. And although certain links (e.g., the links 140) are depicted as being wireless links, it is reiterated that any one or more of the links discussed herein could be wired and/or wireless in nature. Furthermore, the packet-data network 106 may be, include, be part of, be connected to, or be independent of the global network of networks commonly known as the Internet. Entities that communicate via the packet-data network 106 may do so using Internet Protocol (IP) communication, and may be identified using IP addresses.

As mentioned above, the communication system 100 includes the school-network zone 150 that itself includes the classroom-network zone 148. These designations are by way of example and not limitation. In the depicted example, the firewall 110 is connected to the packet-data network 106 via the link 108. The firewall 110 may act to protect entities within the school-network zone 150 from malicious and unwanted communication, among other functions. The firewall 110 is connected via the link 112 to the NAS 114, which may serve, via the firewall 110, as a point of contact to the outside world (e.g., to the packet-data network 106) for all entities within the school-network zone 150. The link 116 connects the NAS 114 with the entities that are within the classroom-network zone 148, which may represent computing and communication entities that are associated with a particular classroom, as an example. In particular, the link 116 connects the NAS 114 with the router 118. It is noted that the NAS 114 and/or another device may handle routing duties, in which case the router 118 could simply be a bridge, switch, or the like; for convenience, that device is referred to herein as the router 118.

The router 118 is connected via the link 120 to the wired LAN 122, which in turn is connected by the links 124 with the desktop computers 128 and 130 and by the links 126 with the desktop computers 132 and 134. Each of the desktop computers 128-134 may include a typical setup having a monitor, keyboard, mouse, and the like. The router 118 is also connected via the link 136 to the wireless access point 138, which in turn is connected via the links 140 with the tablet 142 and with the laptop computers 144 and 146. It is noted that the term client-side computing device is used herein, and that each of the desktop computers 128-134, the tablet 142, and each of the laptop computers 144 and 146 are an example of a client-side computing device as that term is used in this disclosure. And there could be other types of client-side computing devices as well, such as but not limited to smartphones. An example structure of an example client-side computing device is discussed below in connection with FIG. 3.

Figure 2:
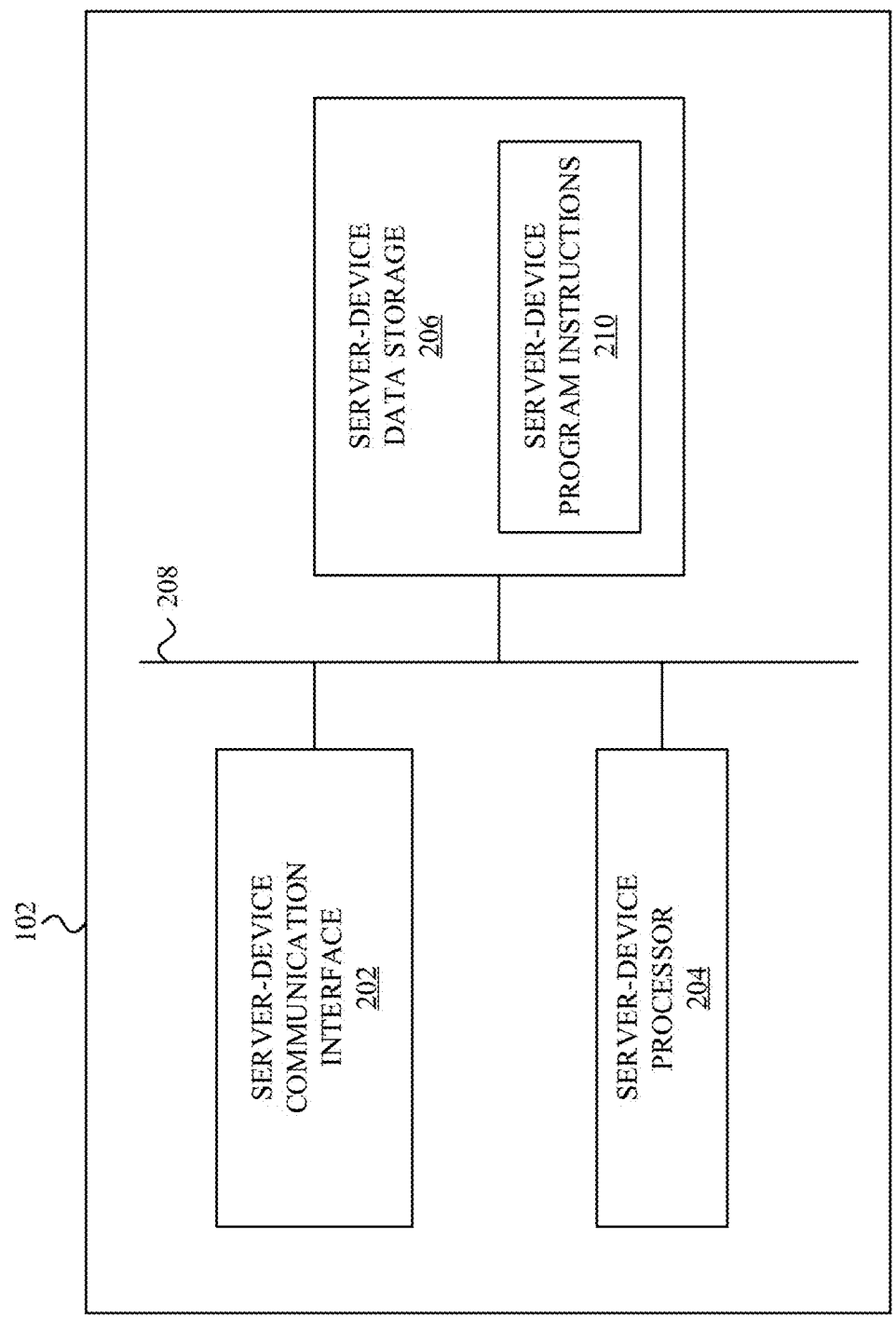
FIG. 2 depicts an example structure of the example server of FIG. 1, in accordance with at least one embodiment.

FIG. 2 depicts an example structure of the example server of FIG. 1, in accordance with at least one embodiment. As depicted in the example of FIG. 2, the server 102 includes a server-device communication interface 202, a server-device processor 204, and server-device data storage 206, all of which are communicatively connected by a server-device system bus 208. The structure of the server 102 that is presented in FIG. 2 is by way of example and not limitation, as other structures could be utilized as well or instead in different implementations. In some instances, the server 102 may also include a server-device user interface (not depicted).

The server-device communication interface 202 may include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the server-device communication interface 202 may include any necessary hardware (e.g., chipsets, antennas, Ethernet cards, etc.), any necessary firmware, and any necessary software for conducting one or more forms of communication with one or more other entities as described herein.

The server-device processor 204 may include one or more processors of any type deemed suitable by those of skill in the relevant art, some examples including a general-purpose microprocessor and a dedicated digital signal processor (DSP).

The server-device data storage 206 may take the form of any non-transitory computer-readable medium or combination of such media, some examples including flash memory, read-only memory (ROM), and random-access memory (RANI) to name but a few, as any one or more types of non-transitory data-storage technology deemed suitable by those of skill in the relevant art could be used. The server-device data storage 206 contains server-device program instructions 210 that are executable by the server-device processor 204 for carrying out various server-side functions described herein.

Figure 3:
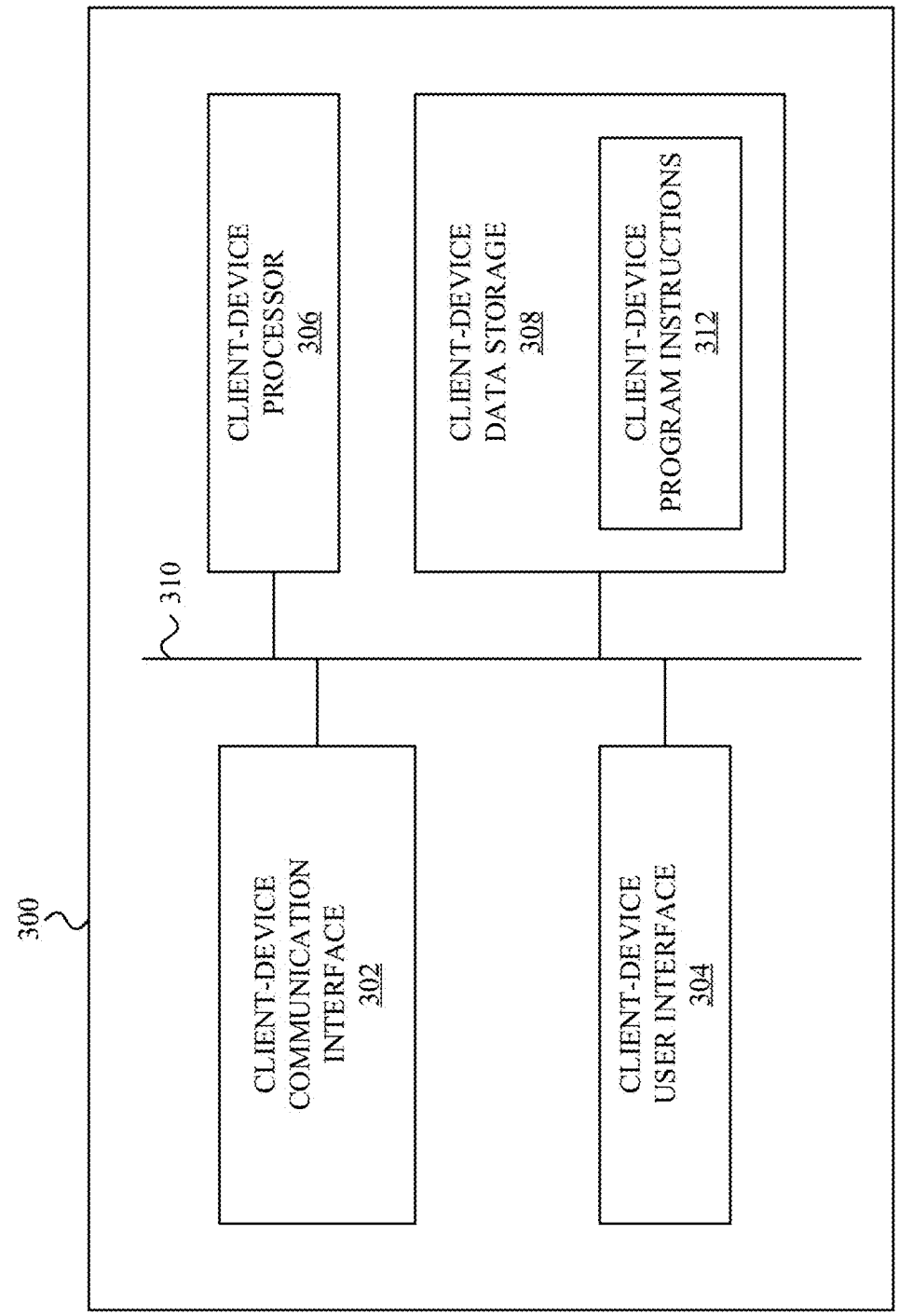
FIG. 3 depicts an example structure of an example one of the client-side computing devices of FIG. 1, in accordance with at least one embodiment.

FIG. 3 depicts an example structure of an example one of the client-side computing devices of FIG. 1, in accordance with at least one embodiment. In particular, FIG. 3 depicts an example structure of a representative client-side computing device 300, which could represent the desktop computer 128, the desktop computer 130, the desktop computer 132, the desktop computer 134, the tablet 142, the laptop computer 144, the laptop computer 146, or any other client-side computing device deemed suitable by those of skill in the art for a particular implementation. As depicted in the example of FIG. 3, the client-side computing device 300 includes a client-device communication interface 302, a client-device user interface 304, a client-device processor 306, and client-device data storage 308, all of which are communicatively connected by a client-device system bus 310. The structure of the client-side computing device 300 that is presented in FIG. 3 is by way of example and not limitation, as other structures could be utilized as well or instead in various different implementations.

The client-device communication interface 302 may include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the client-device communication interface 302 may include any necessary hardware (e.g., chipsets, antennas, Ethernet cards, etc.), any necessary firmware, and any necessary software for conducting one or more forms of communication with one or more other entities as described herein.

The client-device user interface 304 may include one or more input devices (a.k.a. components and the like) and/or one or more output devices (a.k.a. components and the like). With respect to input devices, the client-device user interface 304 may include one or more touchscreens, keyboards, mice, trackpads, touchpads, other pointing devices, buttons, switches, knobs, microphones, and/or the like. With respect to output devices, the client-device user interface 304 may include one or more displays, monitors, speakers, LEDs, and/or the like. Moreover, one or more components (e.g., an interactive touchscreen-and-display component) of the client-device user interface 304 could provide both user-input and user-output functionality. And certainly other user-interface components could be used in various different contexts.

The client-device processor 306 may include one or more processors of any type deemed suitable by those of skill in the relevant art, some examples including a general-purpose microprocessor and a dedicated DSP.

The client-device data storage 308 may take the form of any non-transitory computer-readable medium or combination of such media, some examples including flash memory, ROM, and RAM to name but a few, as any one or more types of non-transitory data-storage technology deemed suitable by those of skill in the relevant art could be used. The client-device data storage 308 contains client-device program instructions 312 that are executable by the client-device processor 306 for carrying out various client-side functions described herein, including but not limited to the method 400 of FIG. 4.

Before proceeding with the balance of this detailed description, a particular linguistic point is worth making. The following two different terms are used in this disclosure: (i) client-side user interface and (ii) client-device user interface. The latter, client-device user interface, refers to hardware components, software drivers, and the like that are part of and/or installed on a given client-side computing device, consistent with the above description of the client-device user interface 304. Thus, a given client-device user interface is a permanent or at least semi-permanent part of its respective client-side computing device. The former, client-side user interface, refers in this disclosure to the executing codebase and corresponding presented visual elements that are particular to the present systems and methods.

Some characteristics of a representative embodiment are that (i) the codebase is a downloaded JavaScript codebase and (ii) the client-side user interface is presented via a web browser (that itself would naturally be presented via the client-device user interface (e.g., the display monitor) of the client-side computing device that has downloaded and is executing the JavaScript codebase). Of course these are only examples, but they serve to illustrate the distinction between client-side user interface and client-device user interface as those terms are used herein. In another example, a client-side computing device is a tablet: the client-device user interface includes the physical touchscreen of that tablet; the client-side user interface of the present methods and systems may be presented in a web browser or an installed application that is executing on the client-side computing device (i.e., tablet). And certainly other examples could be presented here as well.

Figure 4:
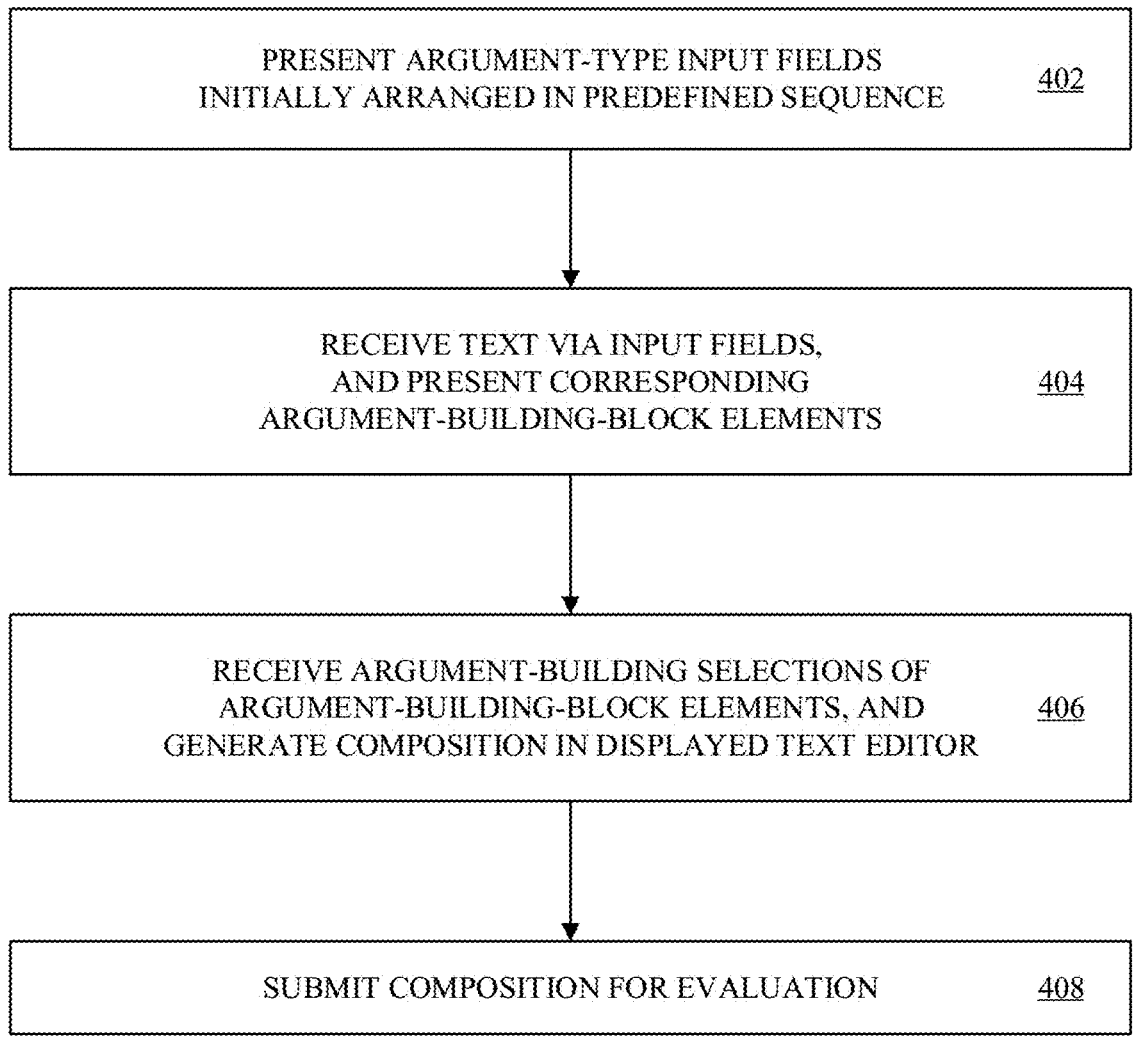
FIG. 4 depicts an example method, in accordance with at least one embodiment.

FIG. 4 depicts an example method, in accordance with at least one embodiment. In particular, FIG. 4 depicts an example method 400 that is described below by way of example and not limitation as being carried out by the desktop computer 128 of FIG. 1. As stated above, the desktop computer 128 is an example of a client-side computing device; as such, any mention of any particular components of the desktop computer 128 will use the 300-series component numbering of FIG. 3. In other examples, any other suitably equipped, programmed, and configured client-side computing device could carry out the method 400.

Prior to describing the particular steps of the method 400, this disclosure first presents, in FIGS. 5-14, an introductory series of example screenshots that could be presented as or via the client-side user interface of the present systems and methods. In at least one embodiment, these screenshots are presented via a web browser that is being executed by the desktop computer 128. Thus, the rendered user-interface elements, text, and so on would correspond with HTML code that is provided to and then displayed by the web browser (e.g., Microsoft Edge®, Microsoft Internet Explorer®, Mozilla Firefox®, Apple Safari®, Google Chrome®, and the like). This HTML code could be generated at least in part by runtime execution of JavaScript code. In at least one embodiment, a static-URL implementation is used across screenshots, such that the displayed URL doesn't change, though asynchronous (e.g., AJAX) messaging can be going on in the background, resulting in changes to the displayed information. Such aspects of modern web programming are within the skill of those in the art, and are thus not exhaustively explained herein.

Figure 5:
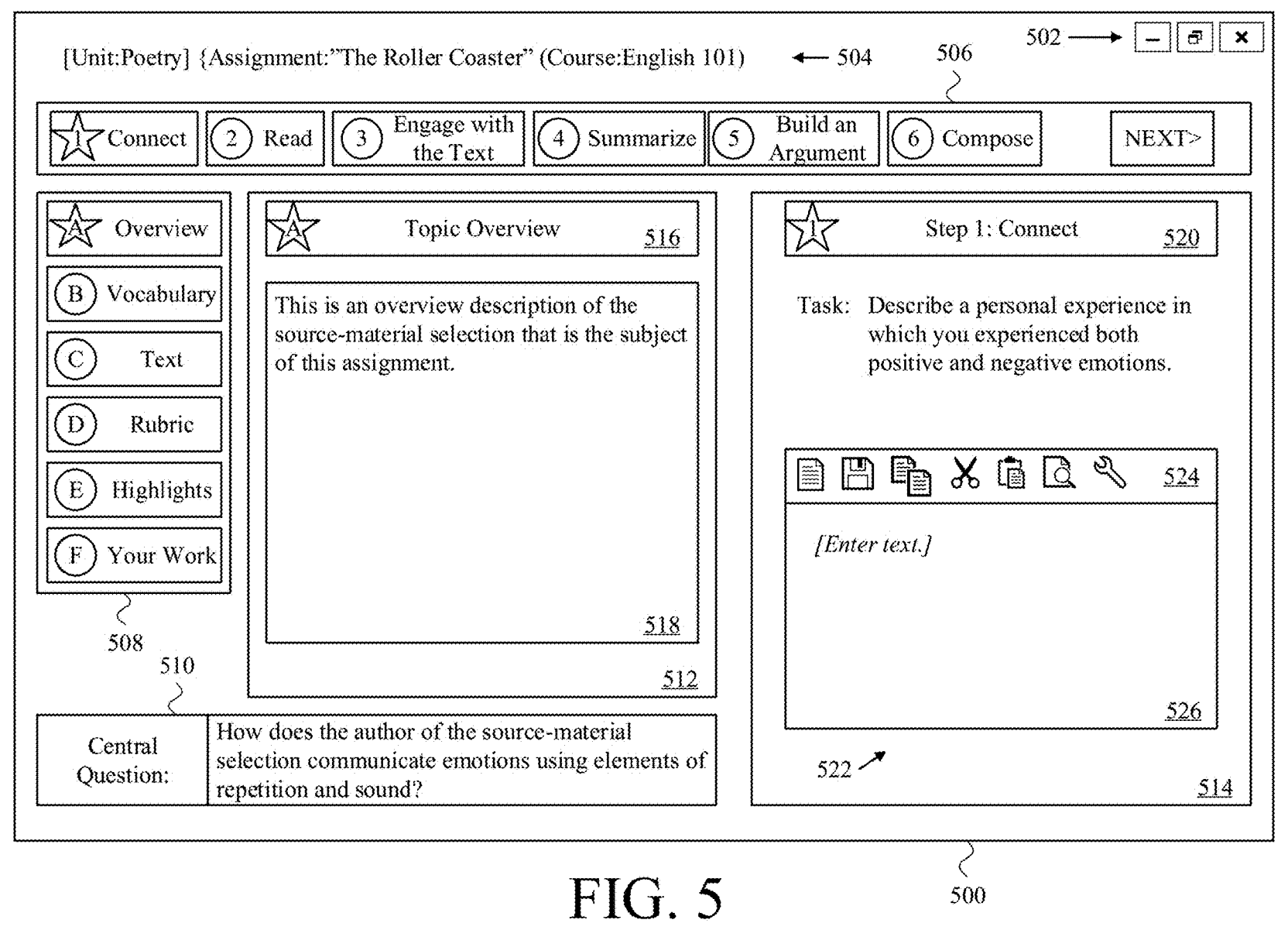

FIG. 5 shows an example first screen that a student might be presented with after first passing through one or more conventional HTML screens directing the student through activities such as logging in to an account and clicking on the particular assignment with which the screenshot 500 is associated. The screenshot 500 includes conventional window-management icons 502, which are selectable for functions such as minimize, restore, and close. The screenshot 500 also includes a heading 504 that lists an example course ("English 101"), an example unit ("Poetry") in that course, and the title ("The Roller Coaster") of the particular (fictitious) poem on which this example assignment is based. The screenshot 500 also includes a central-question element 510, which displays the overall question to which the student is ultimately tasked with writing an argument in response, as is more fully explained below.

The screenshot 500 also includes a content-display-pane control panel 508, which has six separately selectable elements that are labeled "(A) Overview," "(B) Vocabulary," "(C) Text," "(D) Rubric," "(E) Highlights," and "(F) Your Work." The starred "A" icon corresponding with the "Overview" element indicates that the "Overview" element is the currently selected element in the content-display-pane control panel 508. The screenshot 500 further includes a content-display pane 512, in which the currently displayed content is determined by which element of the content-display-pane control panel 508 is currently selected. In the screenshot 500, in which the "Overview" element of the content-display-pane control panel 508 is currently selected, the content-display pane 512 includes (i) a content-display-pane header 516 having a matching starred "A" icon and header text reading "Topic Overview" and (ii) a text-display element 518 that includes text that provides an overview of the source-material selection (i.e., the poem) that is the subject of this assignment; in FIG. 5, there is a placeholder sentence for such an overview (rather than an actual substantive overview).

The screenshot 500 also includes a working-display-pane control panel, which has six separately selectable elements that are labeled "(1) Connect," "(2) Read," "(3) Engage with the Text," "(4) Summarize," "(5) Build an Argument," and "(6) Compose." The working-display-pane control panel 506 also includes navigational controls: in FIG. 5, there is only a "next" navigational control since the currently selected element is the first one (i.e., "Connect") (as indicated by the starred "1" icon); in other figures in which one of the middle four elements is currently selected, both a "previous" navigational control and a "next" navigational control are displayed; in figures in which the last element (i.e., "Compose") is currently selected, there is only a "previous" navigational control, as is conventional in the art. It is noted that the six separately selectable elements in the working-display-pane control panel 506 correspond to an ordered series of predefined different types of user-input stages for producing the composition based on the source-material selection, as is more fully described below.

The screenshot 500 also includes a working-display pane 514, in which the currently displayed content is determined by which element of the working-display-pane control panel 506 is currently selected. In the screenshot 500, in which the "Connect" element of the working-display-pane control panel 506 is currently selected, the working-display pane 514 includes (i) a corresponding working-pane-display header 520 having a matching starred "1" icon and header text reading "Step 1: Connect," (ii) some text instructions that indicate to the student what their (example) assigned task is for this first step, and (iii) a text-editor element 522 that includes a text-editor toolbar 524 and a text-entry input field 526; the student is tasked with entering text in the text-entry input field 526 that is responsive to the task instructions.

In at least one embodiment, the client-side user interface responds to any (or periodically detected, or the like) text changes in the text-entry input field 526 by locally saving the current text and marking (in a manner not necessarily apparent to the student user) the text-entry input field 526 as being in a "dirty" state (i.e., containing different input than what (if anything) had previously been saved). As is known in the arts of web programming, memory (e.g., cache) design and management, and the like, elements are often initialized to a "clean" state, marked "dirty" upon a substantive change being detected, and then reset to clean after that substantive change has been saved to an upstream (and typically relatively more stable) entity such as a remote server, a hard drive, and/or the like. In various different embodiments, the client-side user interface may include input-field-specific indications of student input having been locally and/or remotely stored; moreover, overall indications of whether all then-entered student input has been locally and/or remotely stored may be provided as well. And certainly other example implementations could be listed here.

The next five figures (i.e., FIGS. 6-10) correspond to respective screenshots that the client-side user interface presents to the student user in at least one embodiment when that student user successively clicks one by one down the selectable elements of the content-display-pane control panel 508. Thus, FIG. 6 corresponds to the student having clicked on the "(B) Vocabulary" element, FIG. 7 corresponds to the student having thereafter clicked on the "(C) Text" element, and so forth. It is noted that, while not required, it is the case in this series of screenshots that clicking down through those elements does not change what is currently displayed in the working-display pane 514. It is also noted that, in the depicted embodiment, the central-question element 510 remains displayed on each of those screenshots as well, to keep the central question in the mind of the student user throughout their work on the various assignable and assessable subtasks that make up the overall assignment.

As stated above, FIG. 6 corresponds to a scenario in which the student, while viewing the screenshot 500 of FIG.

5, clicked on the "(B) Vocabulary" element in the content-display-pane control panel 508, resulting in the screenshot 600 of FIG. 6. Elements that are common to both the screenshot 500 and the screenshot 600 are not redundantly mentioned here, and this convention is carried through the balance of this detailed description of the drawings. As can be seen in FIG. 6, the content-display pane 512 now includes (i) a content-display-pane header 602 having a matching starred "B" icon and header text reading "Topic Vocabulary" and (ii) a text-display element 604 that includes a selection of vocabulary words pertaining to the source-material selection. By way of example, five placeholder words (with corresponding parts of speech and definitions) are displayed in the screenshot 600.

If, while viewing the screenshot 600, the student clicked on the "(C) Text" element in the content-display-pane control panel 508, the student (in this depicted example embodiment) would then be presented with the screenshot 700 of FIG. 7. The content-display pane 512 now includes (i) a content-display-pane header 702 having a matching starred "C" icon and header text reading "Source-Material Text," (ii) a text-display element 704, and (iii) an embedded media player 706. The text-display element 704 lists the title and the author of the subject source-material selection, the text of the source-material selection itself, and an embedded image 708 that may have been selected as an appropriate accompaniment to the source-material selection. The embedded media player 706 may be operable to provide the student with an audible recitation of the source-material selection, which may enhance the student's learning process. In some embodiments, the embedded media player 706 plays video instead or as well.

The student may next click on the "(D) Rubric" element in the content-display-pane control panel 508, and accordingly be presented with the screenshot 800 of FIG. 8. The content-display pane 512 now includes (i) a content-display-pane header 702 having a matching starred "D" icon and header text reading "Rubric" and (ii) a text element 804 that includes some evaluation-criteria text pertaining to this overall assignment and that also includes a selectable element 808 that could provide the student with a complete rubric for the assignment, perhaps in the form of a downloaded PDF file, a webpage opening in a new tab or window, and/or some other option deemed suitable by those of skill in the art. As known in the educational arts, a rubric is a set of evaluation criteria and/or expectations for a given assignment, unit, topic, semester, course, and/or the like. In the depicted embodiment, the rubric pertains to this assignment, perhaps drawing on more pervasive themes that the teacher wishes to reinforce across multiple assignments.

If the student next clicks on the "(E) Highlights" element in the content-display-pane control panel 508, the student may next be presented with the screenshot 900 of FIG. 9. The content-display pane 512 now includes (i) a content-display-pane header 902 having a matching starred "E" icon and header text reading "Highlights" and (ii) a display element 904 that includes an example set of three highlight annotations that the student may have made while participating in Step 3 (i.e., "Engage with the Text"), which is described below. It can be seen that each of the three highlight annotations includes a respective indication of category or type of highlight (which may be represented by a respective color, as described below), the word itself that was highlighted by the student, and any highlight-specific notes that the student may have entered in connection with highlighting that particular word (or phrase).

Figure 10:
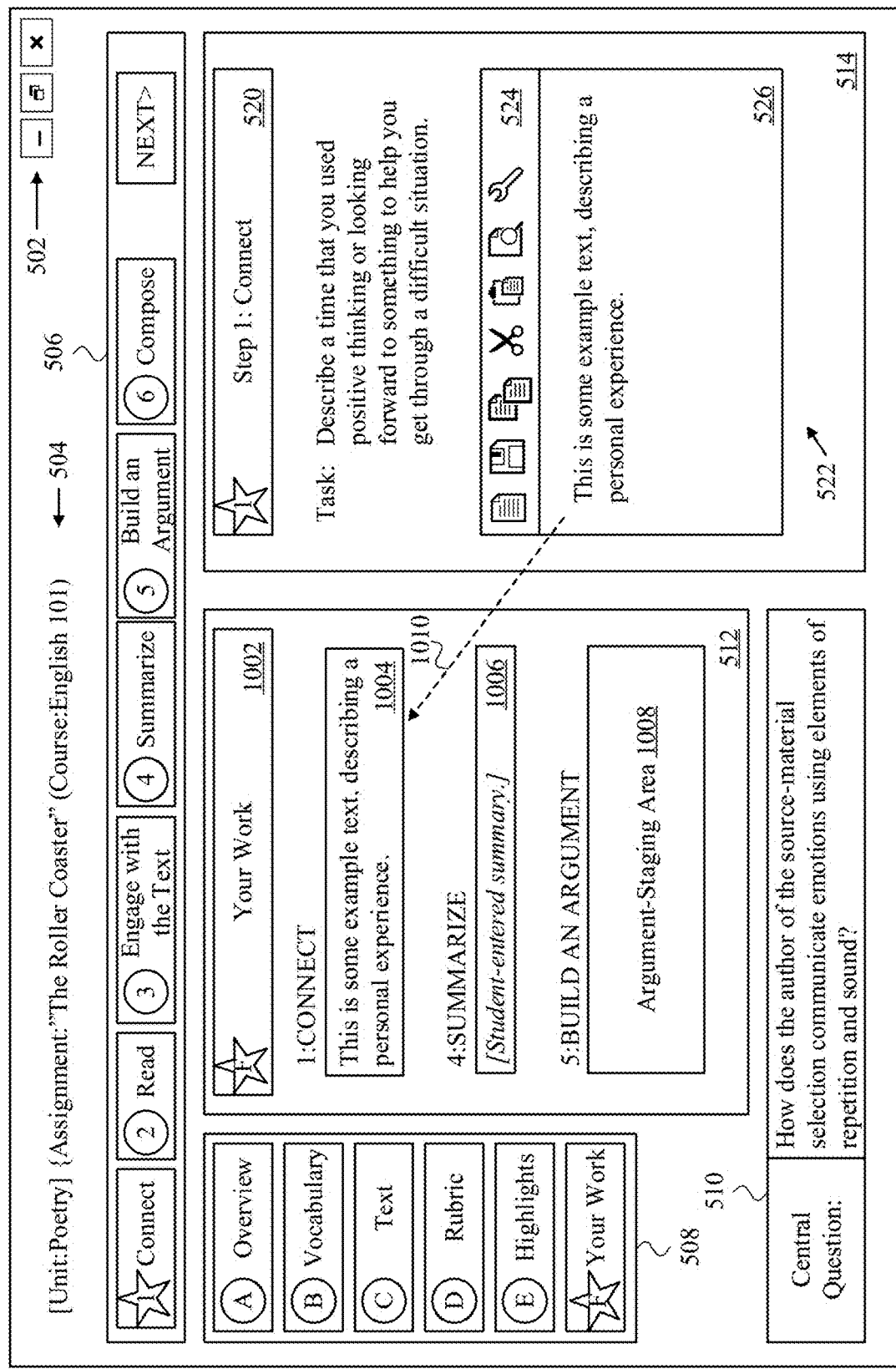
FIG. 10 is a sixth example screenshot of a client-side user interface, in accordance with at least one embodiment.

The student may next, while viewing the screenshot 900 of FIG. 9, click on the "(F) Your Work" element of the content-display-pane control panel 508, resulting in the student being presented with the screenshot 1000 of FIG. 10. In the screenshot 1000, the content-display pane 512 now includes (i) a content-display-pane header 1002 having a matching starred "F" icon and header text reading "Your Work," (ii) a connect element 1004 that corresponds with Step 1 (i.e., "Connect"), (iii) a summarize element 1006 that corresponds with Step 4 (i.e., "Summarize"), and (iv) an argument-staging-area element 1008 that corresponds with Step 5 (i.e., "Build an Argument").

And while the argument-staging-area element 1008 provides the student with a specific type of argument-building staging area (i.e., workspace) that is described more fully below, indeed the entire "Your Work" view of the content-display pane 512 more generally provides the student user with a designated staging area for multiple types of user work product pertaining to the source-material selection. The example screenshot 1000 corresponds with a time where the student has, for example, completed Step 1 ("Connect") (by entering the displayed text (i.e., "This is some example text, describing a personal experience.") in the text-entry input field 526 of the text-editor element 522 that is displayed in the working-display pane 514, but has yet to complete either Step 4 ("Summarize") or Step 5 ("Engage with the Text").

Figure 13:
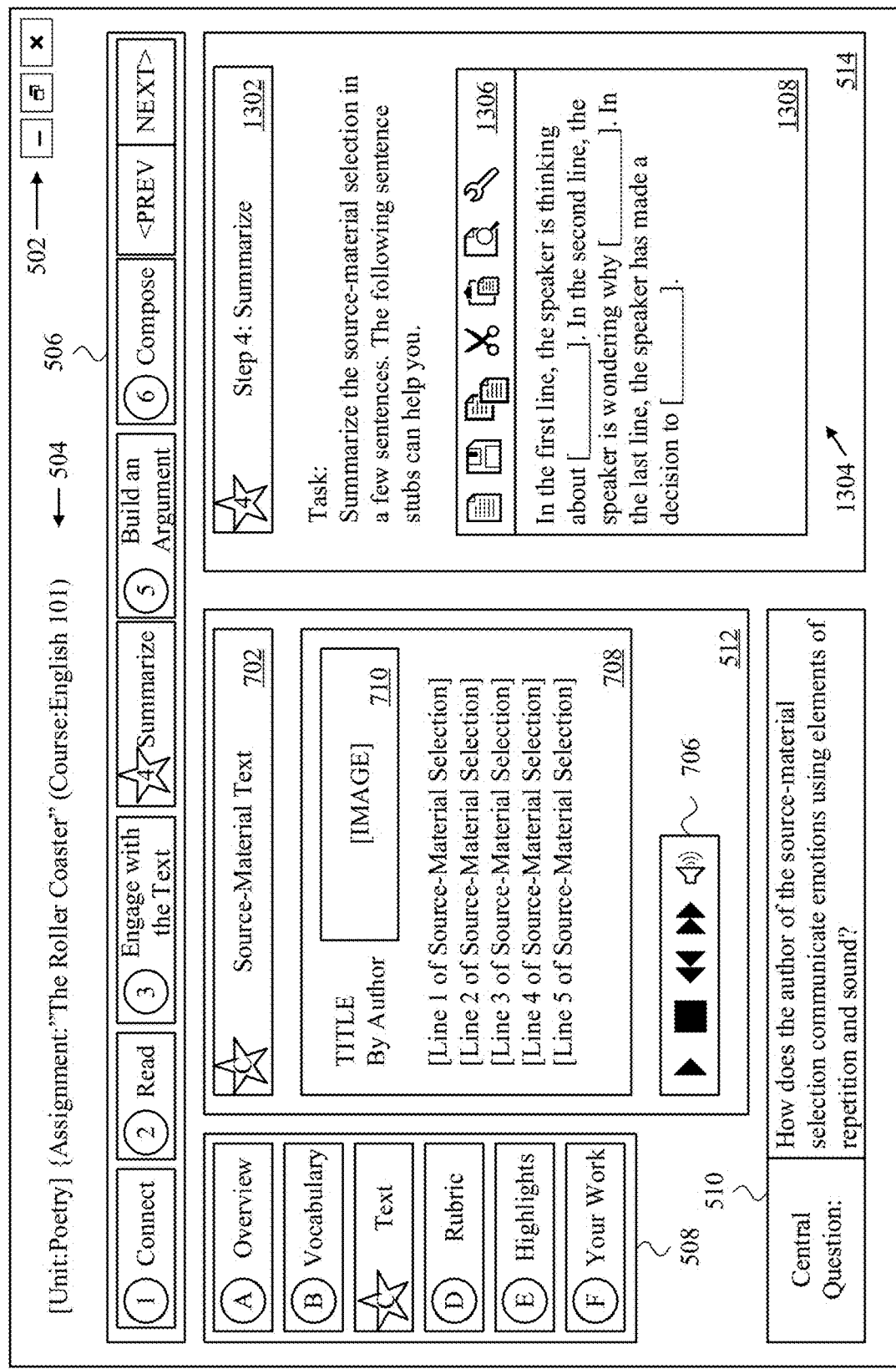
FIG. 13 is a ninth example screenshot of a client-side user interface, in accordance with at least one embodiment.
Figure 14:
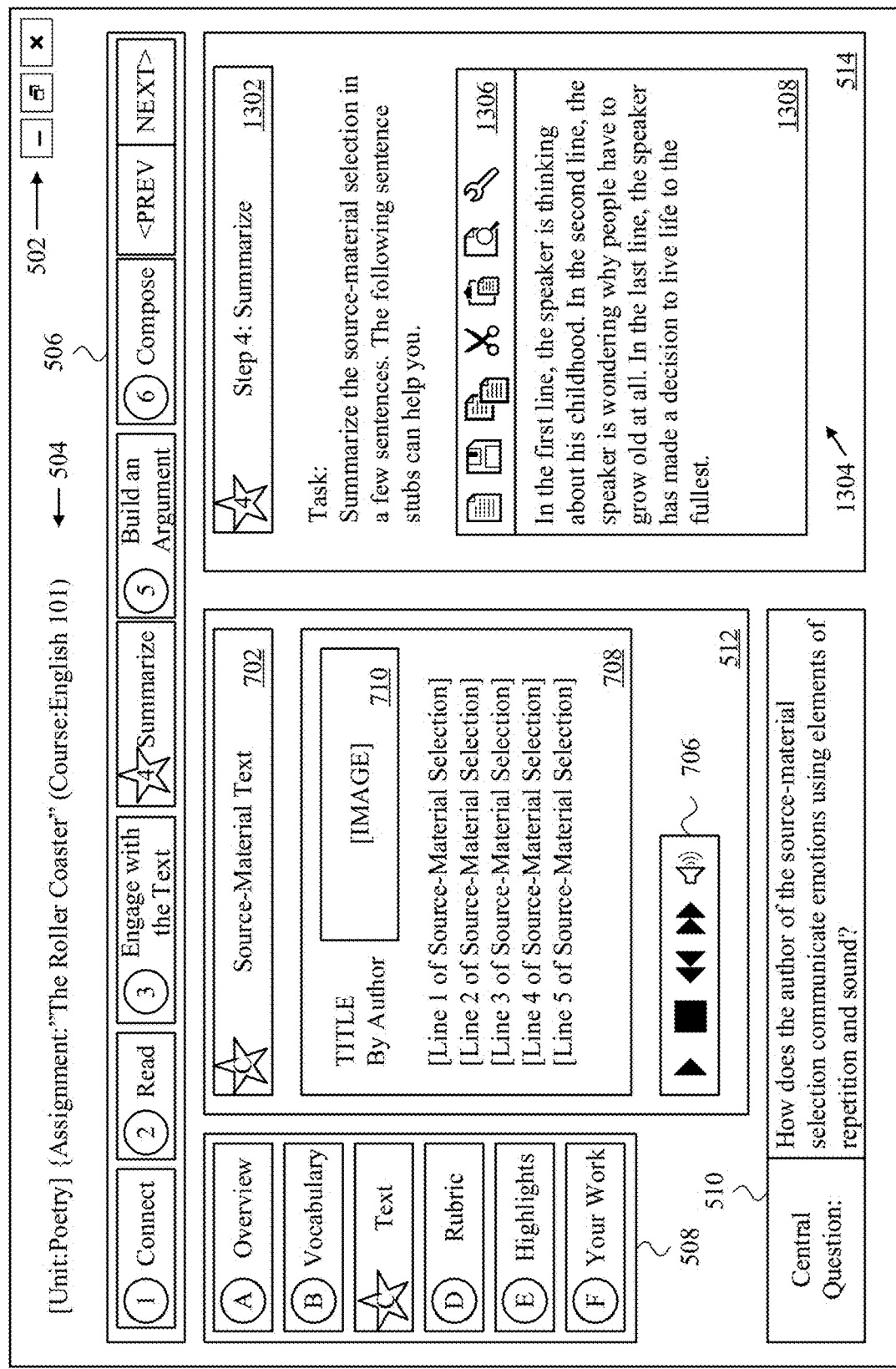
FIG. 14 is a tenth example screenshot of a client-side user interface, in accordance with at least one embodiment.

The above descriptions of FIGS. 5-10 correspond respectively to the various elements of the content-display-pane control panel 508 being selected one by one in descending order according to how they are visually presented. In each of the screenshots of FIGS. 5-9, the working-display pane 514 appeared the same, and then it changed in FIG. 10 when the student user completed Step 1 ("Connect") as described above. It is noted that the text that the student entered in the text-entry input field 526 was auto-populated to the connect element 1004 of the "Your Work" view of the content-display pane 512, as represented by the dashed arrow 1010. It is further noted that this occurs whether or not the "Your Work" view is currently being displayed in the content-display pane 512; that is, if the "Rubric" view was currently displayed at the time the student entered the text into the text-entry input field 526, and the student thereafter clicked on the "(F) Your Work" element in the content-display-pane control panel 508, that entered text would still have been auto-populated to, and thus would appear in, the connect element 1004. The introductory series of example screenshots concludes below with descriptions of FIGS. 11-14, which pertain to Step 2 ("Read") (FIG. 11), Step 3 ("Engage with the Text") (FIG. 12), and Step 4 ("Summarize") (FIGS. 13-14).

Figure 11:
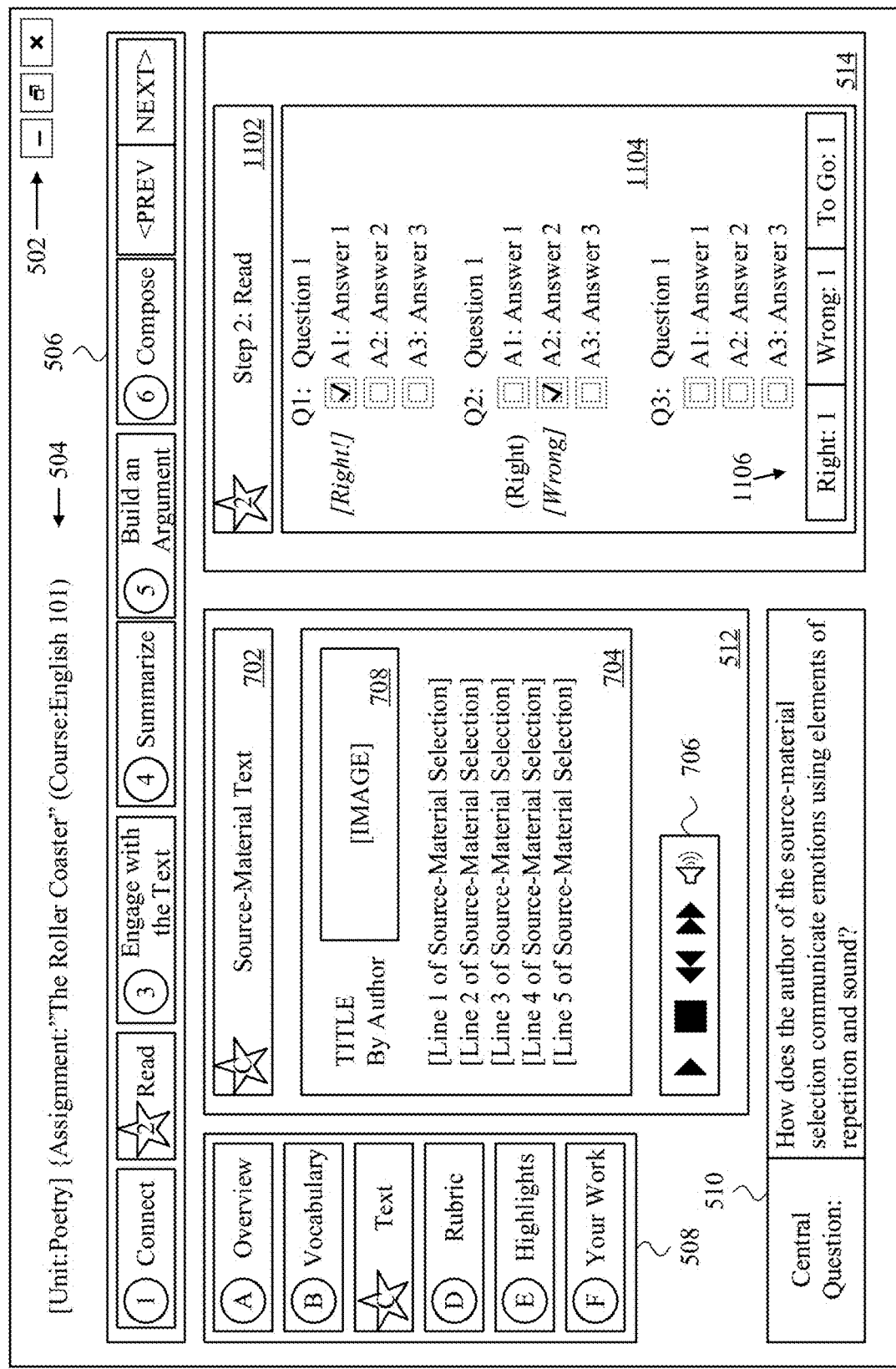
FIG. 11 is a seventh example screenshot of a client-side user interface, in accordance with at least one embodiment.

FIG. 11 depicts an example screenshot 1100 that in at least one embodiment is presented to the student user after the student has clicked (in any order) on the "(B) Vocabulary" element in the content-display-pane control panel 508 and the "(2) Read" element in the working-display-pane control panel 506. This sequence of clicks could have, though need not have, started at a time when the student was viewing the example screenshot 1000 of FIG. 10. Moreover, in at least one embodiment, the student simply clicking on the "(2) Read" element in the working-display-pane control panel 506 results in both the source-material-selection view in the content-display pane 512 and the below-described multiple-choice view in the working-display pane 514.

As a result of that sequence of clicks, the content-display pane 512 displays the source-material-text view that is described above in connection with FIG. 7, and the working-display pane 514 displays a multiple-choice view that includes (i) a working-display-pane header 1102 having a matching starred "2" icon and header text reading "Step 2: Read" and (ii) a multiple-choice-display element 1104 that includes (a) an example set of three multiple-choice questions pertaining to the source-material selection and (b) a realtime-results element 1106. As can be seen in FIG. 11, by way of example, the student has correctly answered the first question, incorrectly answered the second question, and has yet to answer the third question. Some embodiments allow for students to correct initially incorrect answers, while some embodiments do not. Moreover, some embodiments give students a chance to declare their answer as their "final answer," while some embodiments do not. This "Step 2: Read" exercise, which includes some multiple-choice questions (and could certainly instead or in addition include one or more questions or other exercises of one or more other types) is yet another way that the present systems and methods help the student engage with a given text to a helpful extent prior to asking the student to construct (and then assisting the student with constructing) a pertinent argument.

Speaking of engaging with the text, the student may next click on the "(3) Engage with the Text" element in the working-display-pane control panel 506 (and it is noted that in this and other examples described herein, the student may use the "previous" and "next" navigational controls in the working-display-pane control panel 506). This may result in the student being presented with the example screenshot 1200 of FIG. 12. In the screenshot 1200, the content-display pane 512 is still displaying the source-material-text view, while the working-display pane 514 is displaying an engagement view that includes (i) a working-display-pane header 1202 having a matching starred "3" icon and header text reading "Step 3: Engage with the Text" and (ii) a highlight-instruction-display element 1204 that includes some text instructions followed by three example pairs of highlight colors with corresponding types of words/phrases that the student is tasked with locating in the source-material selection and then highlighting with the appropriate color.

As mentioned above, in connection with a given instance of highlighting a given word or phrase, the student has the option of including highlight-specific notes as well. In an embodiment, after highlighting a given word or phrase, the student may be able to right click on the highlighted word or phrase to open a small notepad-like text element into which the student can enter highlight-specific notes. In an embodiment, the "Yellow," "Blue", and "Green" (or whatever colors are chosen for a given implementation) indicators in the highlight-instruction-display element 1204 are selectable by the user to activate an appropriately colored text-highlighting tool. In some embodiments, that sort of right-click functionality to add notes in connection with various specific parts of the source-material selection is provided whether the right-clicked-on text is highlighted or not. And certainly other implementations are possible.

If the student next clicked on—or perhaps used the "next" navigational control to advance to—Step 4 ("Summarize"), the student may then be presented with the screenshot 1300 of FIG. 13, in which the working-display pane 514 includes (i) a working-display-pane header 1302 having a matching starred "4" icon and header text reading "Step 4: Summarize," (ii) textual instructions for this task, and (iii) a text-editor element 1304 that includes a text-editor toolbar 1306 and a text-entry input field 1308. The textual instructions ask the student to summarize the source-material selection in a few sentences, and gives the student the option to use some provided sentence stubs to help get them started. The example screenshot 1400 of FIG. 14 is quite similar to the example screenshot 1300 of FIG. 13, other than that the student has filled in the blanks, thereby turning the provided sentence stubs into complete sentences. The present systems and methods then responsively locally save and perhaps also remotely save that entered text (along with the text that was already there), and also auto-populate the full text of that completed summary into the summarize element 1006.

The above description of FIGS. 5-14 represents an introductory series of screenshots pertaining to the structure and various features of the present systems and methods. The ensuing description returns to the method 400 of FIG. 4, and in particular to discussing the various steps 402-408 of the method 400. In discussing those steps, the ensuing description bounces back and forth between describing FIG. 4 and describing the remaining figures.

Returning, then, to FIG. 4, at step 402, the desktop computer 128 presents, via a client-side user interface of an educational platform, a plurality of user-interface input fields that are initially arranged on the client-side user interface according to a predefined sequence, where each of the user-interface input fields has a respective argument-element type from among a plurality of argument-element types. This step is helpfully illustrated by the screenshot 1500 of FIG. 15, which may be presented to the student upon the student advancing to the Step 5 ("Build an Argument") element of the working-display-pane control panel 506, perhaps from the screenshot 1400 of FIG. 14.

Thus, the client-side user interface presents the screenshot 1500, in which the working-display pane 514 includes (i) a working-display-pane header 1502 having a matching starred "5" icon and header text reading "Step 5: Build an Argument," (ii) a plurality of user-interface input fields (1504-1512), and (iii) an argument-element-adding panel 1514. The plurality of user-interface input fields includes a claim input field 1504, a reason input field 1506, an evidence input field 1508, a reasoning input field 1510, and a counterargument input field 1512. Each of the input fields 1504-1512 may, as in the depicted embodiment, be prepopulated with some helpful text that defines for the student what type of text would be appropriate for the particular input field and/or provides one or more examples of appropriate text for the particular input field. In the example screenshot 1500, that helpful text is what is referenced by the phrases "Claim Guidance," "Reason Guidance," and the like that appear in the respective input fields before the student has entered any text in the respective fields.

If the student wishes at any point in the argument-building process to add an additional input field with the argument-element type set to Reason, Evidence, Reasoning, or Counterargument, the student can simply click on the appropriate element in the argument-element-adding panel 1514, at which point an additional instance of the corresponding type of input field will be added. In an embodiment, students can also delete one or more input fields, perhaps by clicking on an "x" icon as is customary in the art.

In an embodiment, a claim is an overall assertion that the student is making in response to the central question, and thus there would typically only be a single argument element having the argument-element type of Claim. In an embodiment, a reason is a somewhat-summary-level explanation as to why the author is asserting that the claim is correct. In an embodiment, evidence is one or more actual examples from the source-material selection that support the explanation given in the Reason. In an embodiment, the reasoning field may include text where the student is further expounding in more detail regarding why the provided evidence represents support for the corresponding reason. In an embodiment, the counterargument field may be intended for text that lists a reason why the student's claim is wrong in the opinion of some, and also that includes text overcoming that counterargument. And certainly other argument-element types (and composition-element types more generally) could be used in various different implementations.

Returning to FIG. 4, at step 404, the desktop computer 128 receives textual inputs via the respective user-interface input fields, and responsively presents corresponding argument-building-block elements via the client-side user interface according to a current arrangement on the client-side user interface of the user-interface input fields, where each presented argument-building-block element (i) has the same argument-element type as the corresponding user-interface input field and (ii) includes the textual input received via the corresponding user-interface input field. Step 404 is helpfully illustrated by a sequence of screenshots starting with the screenshot 1600 of FIG. 16.

Figure 15:
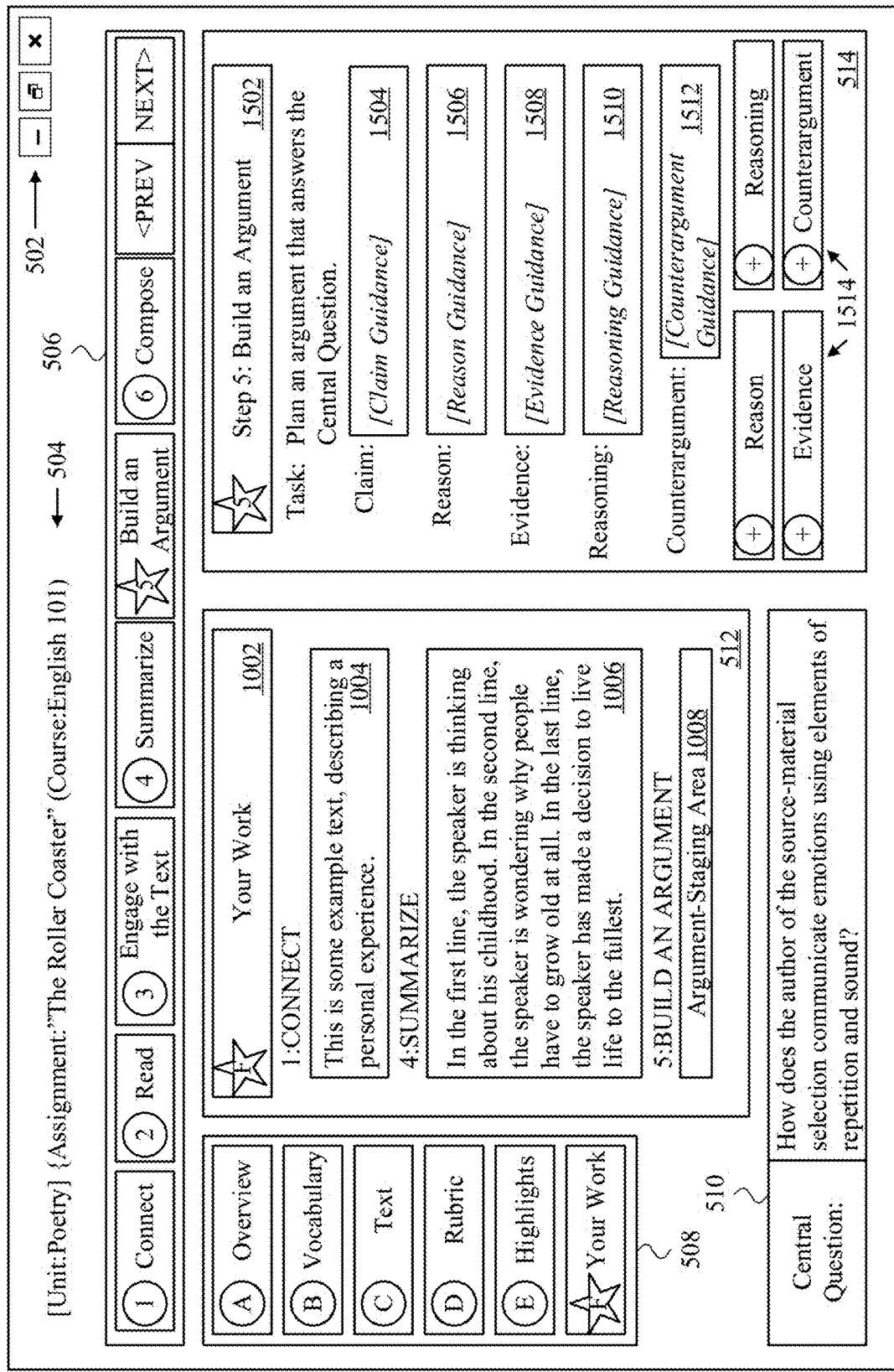
FIG. 15 is an eleventh example screenshot of a client-side user interface, in accordance with at least one embodiment.

It is noted that, for space concerns, several figures, including FIG. 16 contain fewer elements than the more comprehensive screenshots such as the screenshot 1500 of FIG. 15. Moreover, in figures such as FIG. 16, the user-interface elements that are displayed are often shown having a bigger size than those same elements occupy on the more comprehensive screenshots. This technique of illustration and depiction is not intended to imply that the elements that are depicted in figures such as FIG. 16 include everything that the student user would see. Furthermore, some of the elements in FIG. 16 and others like it, such as the arrows 1644, are presented for illustrative and explanatory purposes in this detailed description, but would not necessarily be actually visible to the student user during operation.

The screenshot 1600 of FIG. 16 corresponds to a time when the student has not yet entered text into any of the input fields 1504-1512. The screenshot 1600 does show, however, that an initially blank argument-building-block element 1602-1610 is provided in the argument-staging-area element 1008 in correspondence with each of the respective input fields 1504-1512. The argument-building-block element 1602 includes an argument-element-type indication 1612 that indicates that the type is Claim, a copy-to-composition button 1622, and a text-display space 1632. The argument-building-block element 1604 includes an argument-element-type indication 1614 that indicates that the type is Reason, a copy-to-composition button 1624, and a text-display space 1634. The argument-building-block element 1606 includes an argument-element-type indication 1616 that indicates that the type is Evidence, a copy-to-composition button 1626, and a text-display space 1636. The argument-building-block element 1608 includes an argument-element-type indication 1618 that indicates that the type is Reasoning, a copy-to-composition button 1628, and a text-display space 1638. The argument-building-block element 1610 includes an argument-element-type indication 1620 that indicates that the type is Counterargument, a copy-to-composition button 1630, and a text-display space 1640.

The arrows 1644 indicate the one-to-one correspondence between the respective input fields 1504-1512 and the corresponding respective argument-building-block elements 1602-1610. The argument-staging-area element 1008 also includes a copy-all-to-composition button 1642, which is discussed more fully below, but in general the copy-all-to-composition button 1642 operates as if each of the individual copy-to-composition buttons 1622-1630 were actuated in the order displayed.

The screenshot 1700 of FIG. 17 shows that when the student enters some text into the claim input field 1504, that text is saved by the system and auto-populated into the text-display space 1632 of the corresponding argument-building-block element 1602. It is noted that the recitation in step 404 of responsively presenting an argument-building-block element responsive to receiving text via a given input field encompasses both filling data in with respect to an already-created blank argument-building block element as well as the possibility of generating the argument-building-block element only once the text has been entered and/or saved. The screenshots 1800-2100 of FIGS. 18-21 show in succession a sequence where the student enters text into the input fields 1506-1512. Similar to how the system auto-populated the text entered in the claim input field 1504 into the argument-building-block element 1602, the system populates the text entered into the input fields 1506-1512 into the respective text-display spaces 1634-1640 of the respective argument-building-block elements 1604-1610.

Moreover, it is noted that manual text entry into input fields such as the input fields 1504-1512 is not the only way that argument-building-block elements can be generated and presented. In some embodiments, the highlighting of text as part of Step 3 ("Engage with the Text") causes corresponding argument-building-block elements to be generated that contain the highlighted text and that may have the argument-element type equal to Evidence. In other embodiments, once some text is highlighted in the source-material selection, the student may be able to right click and/or enter some other user-interface command to cause a corresponding argument-building-block element to be created in the argument-staging-area element 1008. It can be seen in FIG. 21 for example that the presented argument-building-block elements 1602-1610 may have the appearance of respective index cards. In some embodiments, this visual presentation could be further enhanced by including graphics such as red and/or blue horizontal lines on the graphical index cards. And certainly other example implementations are possible.

Figure 22:
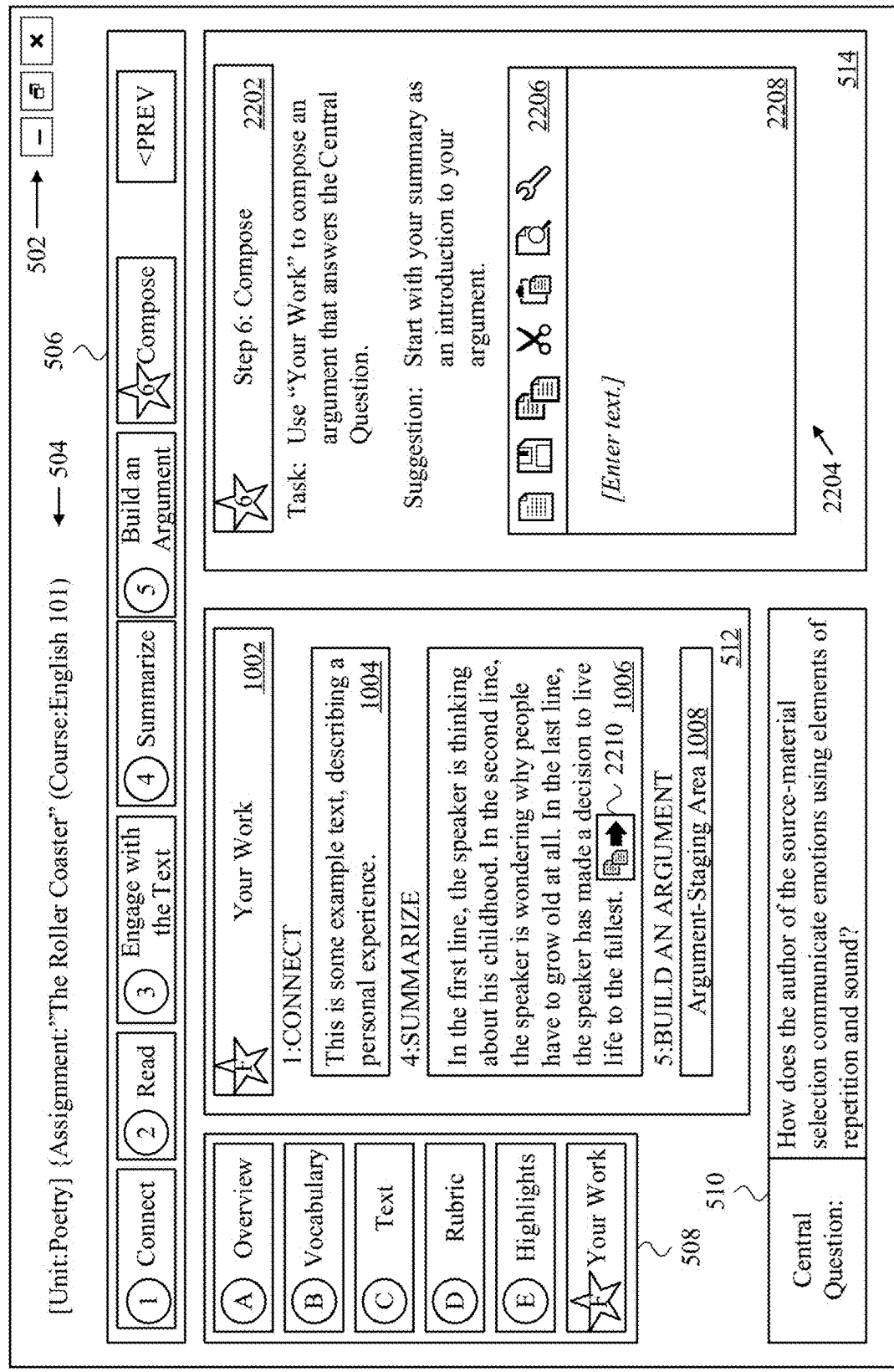
FIG. 22 is an eighteenth example screenshot of a client-side user interface, in accordance with at least one embodiment.
Figure 23:
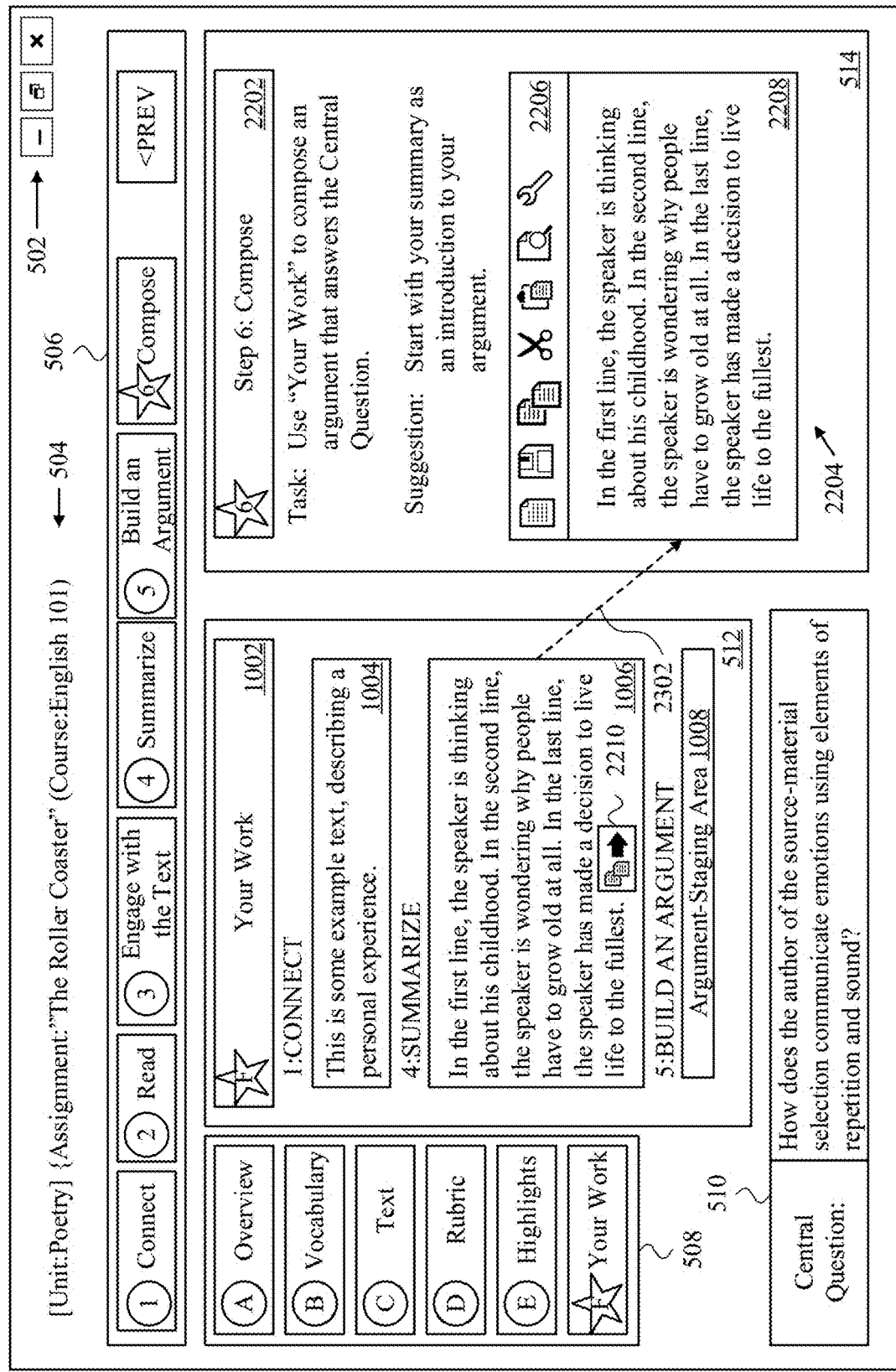
FIG. 23 is a nineteenth example screenshot of a client-side user interface, in accordance with at least one embodiment.

The example screenshot 2200 of FIG. 22 may correspond to the student having completed Step 5 ("Build an Argument") and then advanced the working-display-pane control panel 506 such that Step 6 ("Compose") is then selected. This results in the working-display pane 514 displaying (i) a working-display-pane header 2202 that includes a matching starred "6" icon and the header text "Step 6: Compose," (ii) textual task instructions, (iii) some suggestion text, and (iv) a text-editor element 2204 that includes a text-editor toolbar 2206 and a text-editing space 2208. The task instructions direct the student to use the organized argument elements that the student by now has stored in their "Your Work" space to compose/construct an argument that is responsive to the central question. The suggestion text recommends to the student that they start their argument with the summary that they created in Step 4 ("Summarize"). In the depicted embodiment, once the student has advanced to having Step 6 ("Compose") be displayed in the working-display pane 514, a copy-to-composition button 2210 is displayed in the summarize element 1006 of the your-work view that is being displayed in the content-display pane 512. The screenshot 2300 of FIG. 23, by way of the arrow 2302, graphically depicts that when the student actuates the copy-to-composition button 2210, the text from the summarize element 1006 is auto-populated into the text-editing space 2208.

In some embodiments, the system enables the student, when working on Step 5 ("Build an Argument"), to reorder (e.g., by drag and drop) the input fields 1504-1512 and/or the argument-building-block elements 1602-1610. Upon receiving such reordering input with respect to the input fields 1504-1512, the system responsively reorders the corresponding argument-building-block elements 1602-1610 in the same manner. Similarly, upon receiving reordering input with respect to the argument-building-block elements 1602-1610, the system responsively reorders the corresponding input fields 1504-1512 in the same manner.

Moreover, the system in some embodiments permits linking of sequential input fields 1504-1512 and/or argument-building-block elements 1602-1610. The student may link such elements by highlighting multiple elements, by using a "Control+Click" command as is known in the art, a right click, and/or any other suitable user-interface interaction by which a student could indicate that two or more sequential input fields 1504-1512 or two or more sequential argument-building-block elements 1602-1610 should be linked. Such linking relationships may also be able to be undone by the user. Moreover, in at least one embodiment, any reordering of input fields 1504-1512 and/or argument-building-block elements 1602-1610 would keep any then-current linking relationships intact. Moreover, in some embodiments, a copy-to-composition command entered with respect to any argument-building-block element 1602-1610 in a linked relationship would apply to all argument-building-block elements in the linked relationship (e.g., by auto-populating into the composition their respective text, concatenated in the linked order). And certainly other implementations are possible as well.

Figure 24:
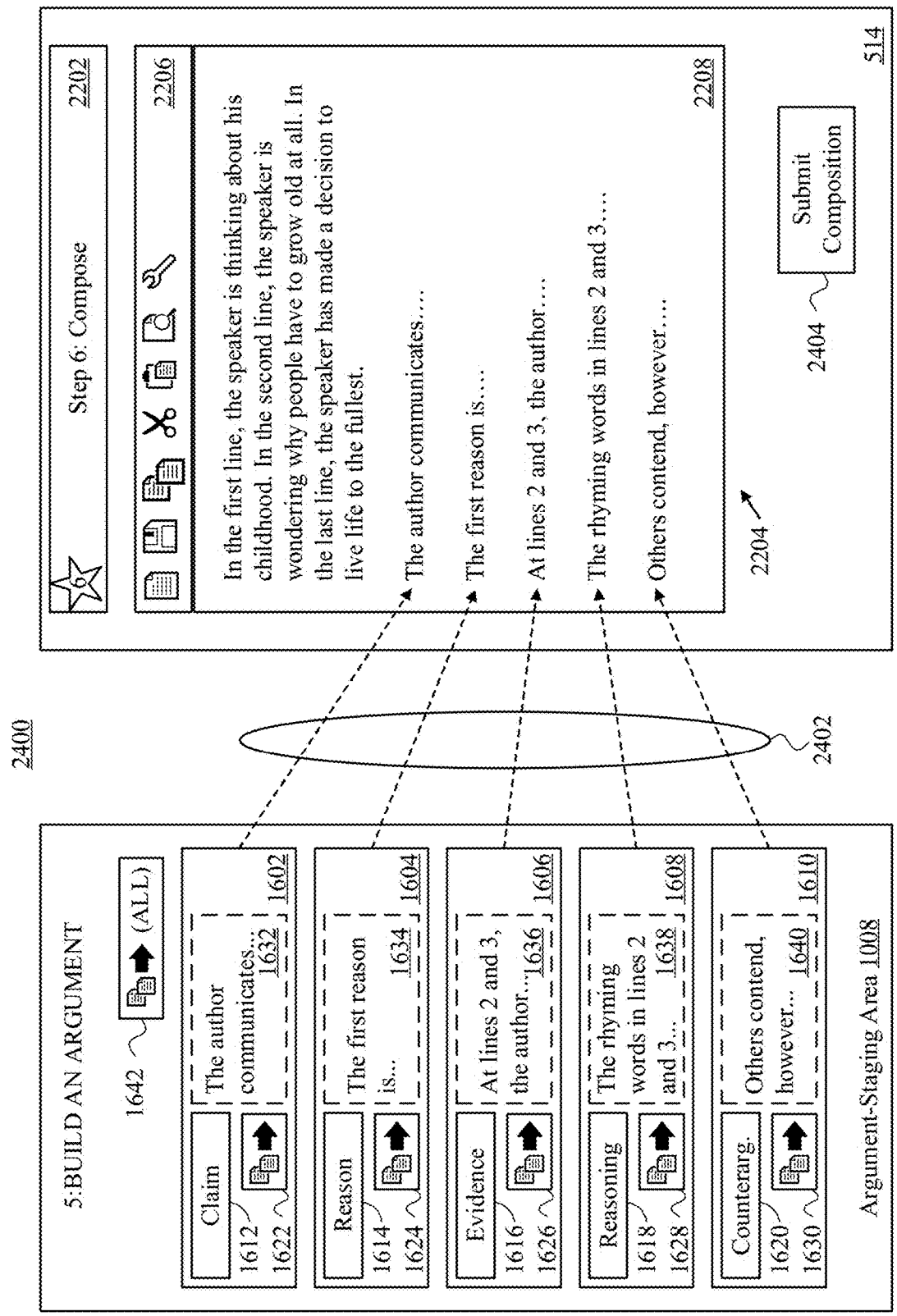
FIG. 24 is a twentieth example screenshot of a client-side user interface, in accordance with at least one embodiment.

Returning to FIG. 4, at step 406, the desktop computer 128 receives, via the client-side user interface, argument-building selections of one or more of the presented argument-building-block elements, and responsively generates a composition in a displayed text editor at least in part by populating the textual inputs into the displayed text editor according to the received argument-building selections. Step 406 in at least one embodiment is illustrated in the example screenshot 2400 of FIG. 24. There it can be seen that the argument-building-block elements 1602-1610 have the text in them from Step 5 ("Building an Argument"). The arrows 2402 depict that actuation of the copy-to-composition buttons 1622-1630 in an order of how they are displayed from top to bottom results in the corresponding text in the corresponding text-display spaces 1632-1640 of the argument-building-block elements 1602-1610 being copied over to the text-editing space 2208. Now that the student is working on Step 6 ("Compose"), a submit-composition button 2404 is displayed in the working-display pane 514 below the text-editor element 2204. It is noted that, in this described example, the submit-composition button 2404 has not yet been actuated.

It is further noted that the argument-building selections of step 406 could take the form of respective actuations (e.g., respective single clicks or respective double clicks) of the copy-to-composition buttons 1622-1630, though they could also take the form of actuation of the copy-all-to-composition button 1642. In other embodiments, the student user is able to drag and drop text from the argument-staging-area element 1008 to the text-editing space 2208. And certainly numerous other possible implementations could be listed here as well. Moreover, as is shown in the example screenshot 2500 of FIG. 25, the student user in at least one embodiment can further edit the text after it has been populated into the text-editor element 2204. In the screenshot 2500, the student has edited the separately populated sentences into more of a conventional paragraph form; and certainly other types of edits and formatting changes could be carried out as well.

Returning to FIG. 4, at step 408, the desktop computer 128 submits the generated composition for evaluation. In an embodiment, step 408 is carried out as a result of the client-side user interface detecting actuation of the submit-composition button 2404. In an embodiment, the generated composition is transmitted from the desktop computer 128 to the server 102 in, for example, an HTTP message. In some embodiments, the client-side user interface that is being executed by the desktop computer 128 in this example iteratively saves the generated composition to the server 102. In such examples, step 408 may simply involve transmitting a message to the server 102 to indicate that the iteratively saved composition has been deemed submitted for evaluation. In some embodiments, evaluation is or at least includes grading in an educational context.

It can happen that educational institutions experience intermittent Internet connectivity. Thus, in some embodiments, the client-side user interface monitors (e.g., with polling messages, keep-alive messages, and/or the like) presence and absence of connectivity to the server 102. In some such embodiments, the client-side user interface operates in a local-saving mode during absence of connectivity and instead operates in a remote-saving mode during presence of connectivity.

As also discussed above, the desktop computer 128 may detect, via the executing client-side user interface, a modification to the textual input in a given user-interface field 1504-1512, and responsively update a status parameter of the given user-interface field from a clean state to a dirty state; moreover, the executing client-side user interface may then include the given user-interface field in a save operation on the basis of the status parameter of the given user-interface field being in the dirty state. Moreover, the client-side user interface may thereafter determine that the save operation was successful, and responsively update the status parameter of the given user-interface field to the clean state.

In some embodiments, the client-side user interface detects what is referred to herein as a save-triggering event, and responsively makes at least one save attempt to save the student's current work (e.g., incremental work by the student with respect to a previous save) to the server 102. In at least one such embodiment, the save-triggering event includes what is referred to herein as a focus-change event. This could take the form of the student closing a user-interface element, hiding (e.g., minimizing) a user-interface element, and/or switching from one user-interface element to another. One example of the latter case might involve detecting that the student has modified a first user-interface element and then selected (e.g., clicked on) a second (i.e., different) user-interface element; another example might involve detecting that the student has modified a first user-interface element and then actually also modified a second (i.e., different) user-interface element. In some embodiments, a save-triggering event takes the form of or at least includes detecting that the student has reordered two or more elements (e.g., input fields 1504-1512 or argument-building-block elements 1602-1610). And certainly other examples could be listed as well.

In at least one embodiment, making at least one save attempt includes making a first save attempt and initiating an attempt timer, as well as detecting an expiration of the attempt timer, and responsively making a second save attempt. And certainly any number of save attempts could be made using any suitable number of timers. Upon detecting failure to save the student's work to the server 102 by each and every save attempt in the at least one save attempt, the client-side user interface may responsively transition to a read-only state, so that no additional work by the student will go unsaved and therefore be lost to the student.

The client-side user interface may transition to the read-only state for a predetermined time period, after which the client-side user interface may make at least one additional save attempt to save the student's current work to the server 102. If that works, the client-side user interface may transition back to its initial and default read/write state; if it doesn't work, the client-side user interface may remain in the read-only state for at least another predetermined time period. And certainly numerous other possible implementations could be listed here. As represented by the above examples, the student's current work may pertain to multiple different types of assigned tasks, such as free-text entry, multiple-choice-question answering, text annotation, and/or one or more other types of tasks.

As mentioned above, the client-side user interface of the present systems and methods may be realized at least in part by runtime execution of a JavaScript codebase. In some such embodiments, this JavaScript codebase defines a model referred to herein as an argument-builder studentResponse model. In some such embodiments, the argument-builder studentResponse model is a child model of a JavaScript studentAssignment model that corresponds to the overall assignment. Thus, the studentAssignment model may correspond to all of the Steps 1-6 that are discussed above, and may include multiple different studentResponse models, each of which may correspond with a respective one of those Steps 1-6. The argument-builder studentResponse model would correspond with Step 5 ("Building an Argument"). Each child studentResponse model of the parent studentAssignment model may function to detect student input and responsively locally save that student input. Each child studentResponse model may further have responsibility for saving its respective locally saved student input to the server 102, and to report to the parent studentAssignment model using a promise to indicate success or failure to do so. And certainly other implementations are possible, as this is but one example.

What is claimed is:

1. A method comprising:
presenting, via a client-side user interface of an educational platform, a source-material selection juxtaposed with a summary text input field for summarizing the presented source-material selection;
receiving textual input via the summary text input field and responsively saving a summary element comprising the received textual input;
presenting, via the client-side user interface, a plurality of user-interface input fields initially arranged on the client-side user interface according to a predefined sequence, wherein each of the user-interface input fields has a respective argument-element type from among a plurality of argument-element types;
presenting, via the client-side user interface, a staging area for user-entered work, the staging area comprising:
the summary element; and
argument-building-block elements arranged according to a current arrangement of the user-interface input fields, wherein each argument-building-block-element has the same argument-element type as the corresponding user-interface input field;
receiving textual inputs via the respective user-interface input fields, and responsively populating corresponding argument-building-block elements, each argument-building-block element populated with the textual inputs received via the corresponding user-interface input field;
receiving, via the client-side user interface, reordering input with respect to the user-interface input fields, and responsively presenting, in the staging area, a reordered arrangement of the corresponding argument-building-block elements in accordance with the received reordering input;
generating, in a displayed text editor, an editable composition pertaining to the source-material selection by receiving, via the client-side user interface, a sequence of element selections identifying at least one element from (i) the summary element and (ii) argument-building-block elements from the presented reordered arrangement of argument-building-block elements, the composition generated at least in part by populating the textual inputs of the identified elements into the displayed text editor, the textual inputs arranged according to the received sequence of element selections; and
submitting the generated composition for evaluation by detecting, via the client-side user interface, a submit-composition input and responsively transmitting a submission message.

2. The method of claim 1, wherein:
the plurality of argument-element types comprises claim, reasoning, evidence, reason, and counterargument; and
the predefined sequence is claim, reason, evidence, reasoning, counterargument.

3. The method of claim 1, further comprising:
presenting, via the client-side user interface, the source-material selection in juxtaposition with the presented plurality of user-interface input fields.

4. The method of claim 3, further comprising:
receiving annotation input with respect to the presented source-material selection, and responsively updating the presented source-material selection to reflect the received annotation input.

5. The method of claim 1, wherein the presented argument-building-block elements have the appearance of respective index cards.

6. The method of claim 1, further comprising:
receiving, via the client-side user interface, reordering input with respect to the argument-building-block elements, and responsively reordering both the user-interface input fields and the corresponding argument-building-block elements in accordance with the received reordering input.

7. The method of claim 1, wherein the client-side user interface includes a dedicated content-display pane and a dedicated working pane.

8. The method of claim 7, wherein the client-side user interface further includes:
a first control panel for selecting what is displayed in the dedicated content-display pane from among a plurality of content-display options; and
a second control panel for selecting what is displayed in the dedicated working pane from among a plurality of working-pane options.

9. The method of claim 8, wherein the plurality of content-display options comprises two or more of a source-material selection on which the composition is to be based, an overview of the source-material selection, a selection of vocabulary pertaining to the source-material selection, a rubric pertaining to the composition, a set of user annotations of the source-material selection, and a designated staging area for user work product pertaining to the source-material selection.

10. The method of claim 9, wherein the plurality of working-pane options comprises an ordered series of pre-defined different types of user-input stages for producing the composition based on the source-material selection.

11. The method of claim 8, wherein the plurality of working-pane options comprises an ordered series of pre-defined different types of user-input stages for producing the composition based on a source-material selection.

12. The method of claim 1, further comprising:
receiving text-modification input via the displayed text editor with respect to the populated textual inputs,
wherein generating the composition further comprises modifying the populated textual inputs in the displayed text editor according to the received text-modification input prior to submitting the generated composition for evaluation.

13. The method of claim 1, carried out at least in part by a web browser executing on a processor-based computing-and-communication system.

14. The method of claim 1, carried out at least in part by runtime execution of JavaScript code.

15. The method of claim 1, carried out at least in part by a JavaScript argument-builder studentResponse model.

16. The method of claim 15, wherein the JavaScript argument-builder studentResponse model is a child model of a JavaScript studentAssignment model.

17. The method of claim 16, wherein the JavaScript studentAssignment model comprises at least one additional child JavaScript studentResponse model other than the JavaScript argument-builder studentResponse model, wherein the at least one additional child JavaScript studentResponse model has a different student-input format than that of the JavaScript argument-builder studentResponse model.

18. A client-side computing device comprising:
a client-device communication interface;
a client-device user interface;
a client-device processor; and
client-device data storage containing client-device instructions executable by the client-device processor for causing the client-side computing device to carry out a set of functions, wherein the set of functions includes:
presenting, via a client-side user interface of an educational platform via the client-device user interface, a source-material selection juxtaposed with a summary text input field for summarizing the presented source-material selection;
receiving textual input via the summary text input field and responsively saving a summary element comprising the received textual input;
presenting, via the client-side user interface, a plurality of user-interface input fields initially arranged on the client-side user interface according to a predefined sequence, wherein each of the user-interface input fields has a respective argument-element type from among a plurality of argument-element types;
presenting, via the client-side user interface, a staging area for user-entered work, the staging area comprising:
the summary element; and
argument-building-block elements arranged according to a current arrangement of the user-interface input fields, wherein each argument-building-block-element has the same argument-element type as the corresponding user-interface input field;
receiving textual inputs via the respective user-interface input fields, and responsively populating corresponding argument-building-block elements, each argument-building-block element populated with the textual inputs received via the corresponding user-interface input field;
receiving, via the client-side user interface, reordering input with respect to the user-interface input fields, and responsively presenting, in the staging area, a reordered arrangement of the corresponding argument-building-block elements in accordance with the received reordering input;
generating, in a displayed text editor, an editable composition pertaining to the source-material selection by receiving, via the client-side user interface, a sequence of element selections identifying at least one element from (i) the summary element and (ii) argument-building-block elements from the presented reordered arrangement of argument-building-block elements, the composition generated at least in part by populating the textual inputs of the identified elements into the displayed text editor, the textual inputs arranged according to the received sequence of element selections; and
submitting, via the communication interface, the generated composition for evaluation by detecting, via the client-side user interface, a submit-composition input and responsively transmitting a submission message.

19. The method of claim 1, further comprising:
receiving, via the client-side user interface, linking input with respect to a contiguous sequence of two or more of the user-interface input fields, wherein the contiguous sequence of the user-interface input fields corresponds to a contiguous sequence of the argument-building-block elements, wherein presenting a reordered arrangement of the corresponding argument-building-block elements in accordance with the received reordering input includes:
maintaining the contiguous sequence of user-interface input fields; and
maintaining the contiguous sequence of the argument-building-block elements.

20. A method comprising:
presenting, via a client-side user interface of an educational platform, a content-display pane and a working-display pane;
in a first mode:
presenting, in the content-display pane, source material;
presenting, in the working-display pane, a summary text input field for summarizing the presented source material; and
receiving textual input via the summary text input field and responsively saving a summary element comprising the received textual input;
in a second mode:
presenting, in the working-display pane, a plurality of user-interface input fields initially arranged on the client-side user interface according to a predefined sequence, wherein each of the user-interface input fields has a respective argument-element type from among a plurality of argument-element types;

presenting, in the content-display pane, a staging area for user-entered work, the staging area comprising:

the summary element; and argument-building-block elements arranged according to a current arrangement of the user-interface input fields, wherein each argument-building-block-element has the same argument-element type as the corresponding user-interface input field;

receiving textual inputs via the respective user-interface input fields, and responsively populating corresponding argument-building-block elements, each argument-building-block element populated with the textual inputs received via the corresponding user-interface input field;

receiving, via the client-side user interface, reordering input with respect to the user-interface input fields, and responsively presenting a reordered arrangement of the corresponding argument-building-block elements in the staging area in accordance with the received reordering input; and in a third mode:

providing, in the working-display pane, a text editor; and generating, in a the text editor, an editable composition pertaining to the source material by receiving, via the staging area, a sequence of element selections identifying at least one element from (i) the summary element and (ii) argument- building-block elements from the presented reordered arrangement of argument-building-block elements, the composition generated at least in part by populating the textual inputs of the identified elements into the displayed text editor, the textual inputs arranged according to the received sequence of element selections; and submitting the generated composition for evaluation by detecting, via the client-side user interface, a submit-composition input and responsively transmitting a submission message.

* * * * *